(12) United States Patent
Wong et al.

(10) Patent No.: US 12,556,219 B2
(45) Date of Patent: Feb. 17, 2026

(54) COMMUNICATIONS DEVICE, INFRASTRUCTURE EQUIPMENT AND METHODS

(71) Applicant: Sony Group Corporation, Tokyo (JP)

(72) Inventors: Shin Horng Wong, Basingstoke (GB); Martin Warwick Beale, Basingstoke (GB); Kazuyuki Shimezawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 516 days.

(21) Appl. No.: 18/013,580

(22) PCT Filed: Jul. 16, 2021

(86) PCT No.: PCT/EP2021/070060
§ 371 (c)(1),
(2) Date: Dec. 29, 2022

(87) PCT Pub. No.: WO2022/017992
PCT Pub. Date: Jan. 27, 2022

(65) Prior Publication Data
US 2023/0246669 A1    Aug. 3, 2023

(30) Foreign Application Priority Data
Jul. 24, 2020   (EP) .................................. 20187780

(51) Int. Cl.
*H04W 72/04*   (2023.01)
*H04B 1/401*   (2015.01)
(Continued)

(52) U.S. Cl.
CPC ............ *H04B 1/401* (2013.01); *H04W 72/02* (2013.01); *H04W 72/0446* (2013.01); *H04W 72/56* (2023.01)

(58) Field of Classification Search
CPC ............ H04W 72/23; H04W 72/0446; H04W 74/006; H04W 72/21; H04W 74/0866;
(Continued)

(56) References Cited

U.S. PATENT DOCUMENTS 11,716,707 B2 *  8/2023  Kim .................. H04W 72/0453
                                                         370/230
2012/0051329 A1 * 3/2012  Hirano ................. H04L 1/0026
                                                         370/332
(Continued)

OTHER PUBLICATIONS

International Search Report and Written Opinion mailed on Nov. 19, 2021, received for PCT Application PCT/EP2021/070060, filed on Jul. 16, 2021, 12 pages.
(Continued)

*Primary Examiner* — Sai Aung
(74) *Attorney, Agent, or Firm* — XSENSUS LLP

(57) ABSTRACT

A method of operating a communications device, the method comprising determining that first and second resources are allocated for one of transmission and reception of signals by the device, the second resources being different from the first resources, determining that a time period separating the first and second resources is below a predetermined maximum switching time threshold, determining a first priority associated with the first resources, determining a second priority associated with the second resources, determining a start of a switching time gap based on the first priority and the second priority, controlling a receiver of the device to refrain from receiving signals during the switching time gap, controlling a transmitter of the device to refrain from transmitting signals during the switching time gap, and transmitting or receiving first data using at least a portion of one of the first and second resources.

20 Claims, 9 Drawing Sheets

(51) Int. Cl.
  *H04W 72/02* (2009.01)
  *H04W 72/0446* (2023.01)
  *H04W 72/23* (2023.01)
  *H04W 72/56* (2023.01)
  *H04W 74/08* (2024.01)

(58) Field of Classification Search
  CPC ......... H04W 74/0808; H04W 74/0816; H04W 74/0833
  See application file for complete search history.

(56) References Cited

U.S. PATENT DOCUMENTS

| | | | |
|---|---|---|---|
| 2018/0007495 A1 | 1/2018 | Martin et al. | |
| 2018/0352573 A1* | 12/2018 | Yang | H04W 16/14 |
| 2019/0141647 A1 | 5/2019 | Nimbalker et al. | |
| 2019/0229868 A1* | 7/2019 | Siomina | H04W 24/10 |
| 2020/0068534 A1* | 2/2020 | Li | H04W 74/0808 |
| 2021/0410187 A1* | 12/2021 | Yang | H04W 74/006 |
| 2022/0070922 A1* | 3/2022 | Talarico | H04W 72/1268 |
| 2022/0086897 A1* | 3/2022 | Wei | H04W 74/002 |
| 2022/0132527 A1* | 4/2022 | Cui | H04W 56/001 |

OTHER PUBLICATIONS

3GPP, "NR; NR and NG-RAN Overall Description; Stage 2 (Release 15)", 3GPP TS 38.300 V15.2.0, Jun. 2018, pp. 1-87.

Holma et al., "LTE for UMTS OFDMA and SC-FDMA Based Radio Access", John Wiley & Sons, 2009, 232 pages.

Ericsson, "New SID on support of reduced capability NR devices", 3GPP TSG RAN Meeting #86, RP-193238, Dec. 9-12, 2019, 5 pages.

3GPP, "Evolved Universal Terrestrial Radio Access (E-UTRA) and Evolved Universal Terrestrial Radio Access Network (E-UTRAN); Overall description; Stage 2 (Release 16)", 3GPP TS 36.300 V16.1.0, Mar. 2020, pp. 1-386.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2021/070060, filed Jul. 16, 2021, which claims priority to European Patent Application No. 20187780.0, filed Jul. 24, 2020, the entire contents of each are incorporated herein by reference.

BACKGROUND

Field

The present disclosure relates to communications devices, infrastructure equipment and methods for the transmission of data in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Different devices may have different capabilities, and this gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
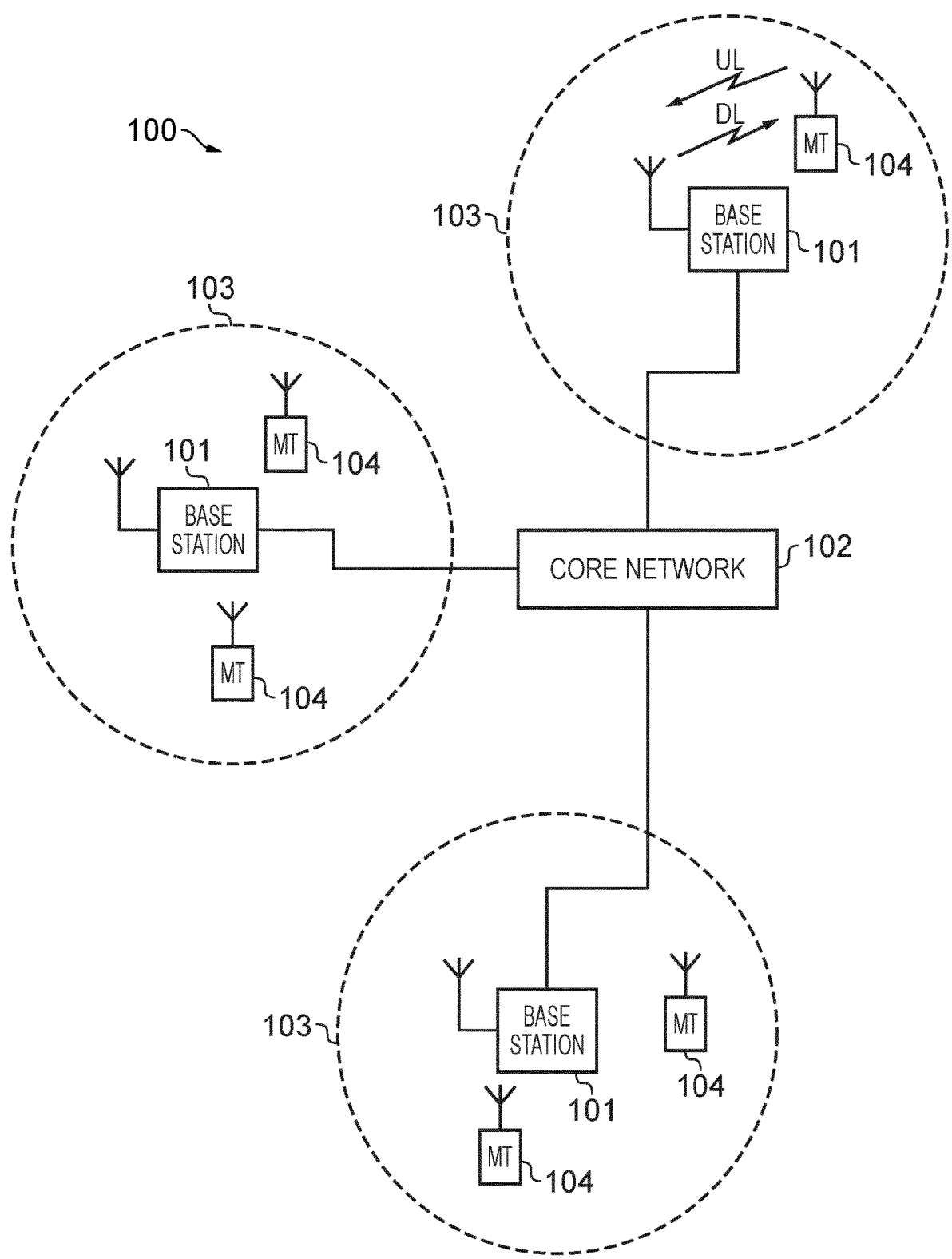
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
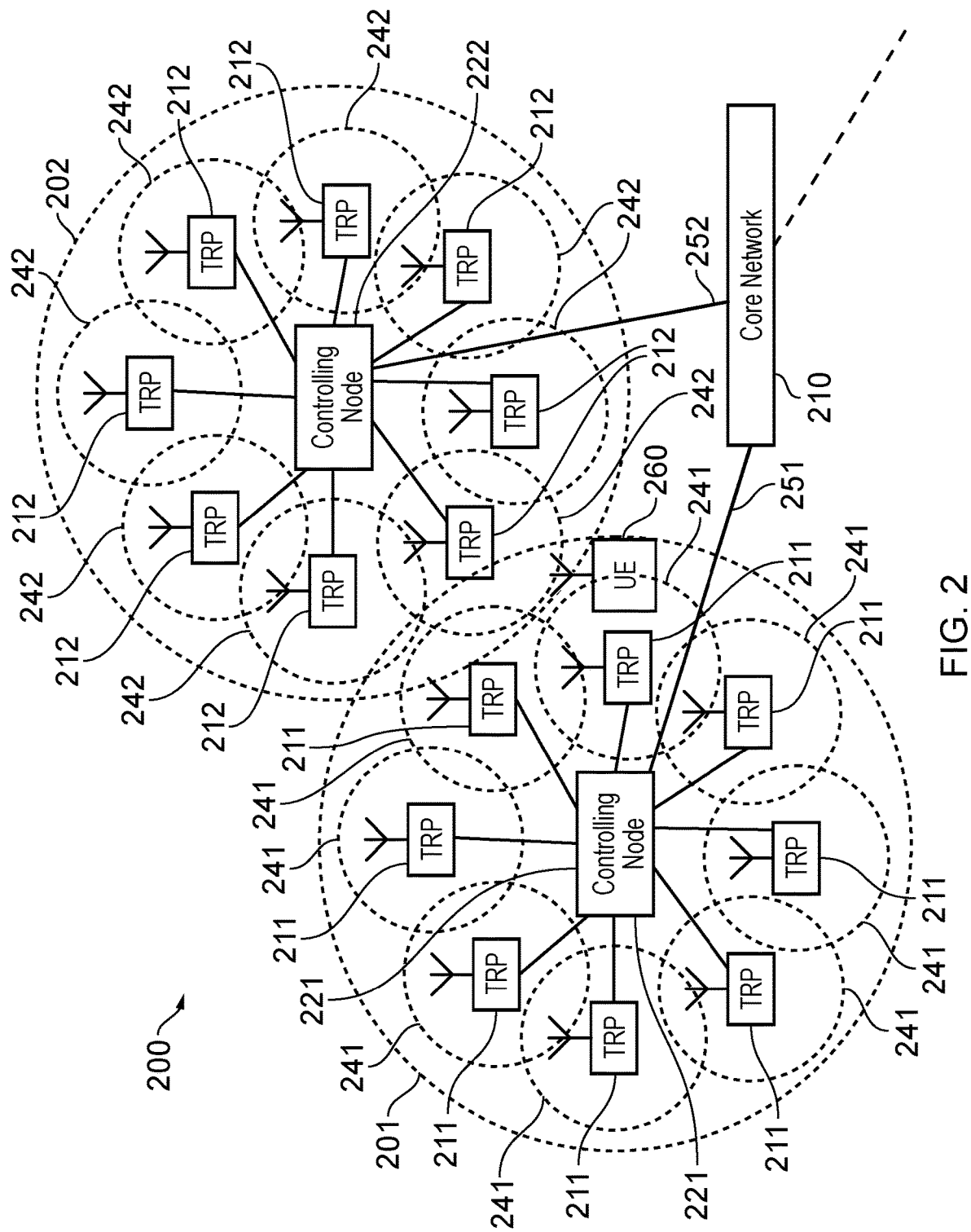
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
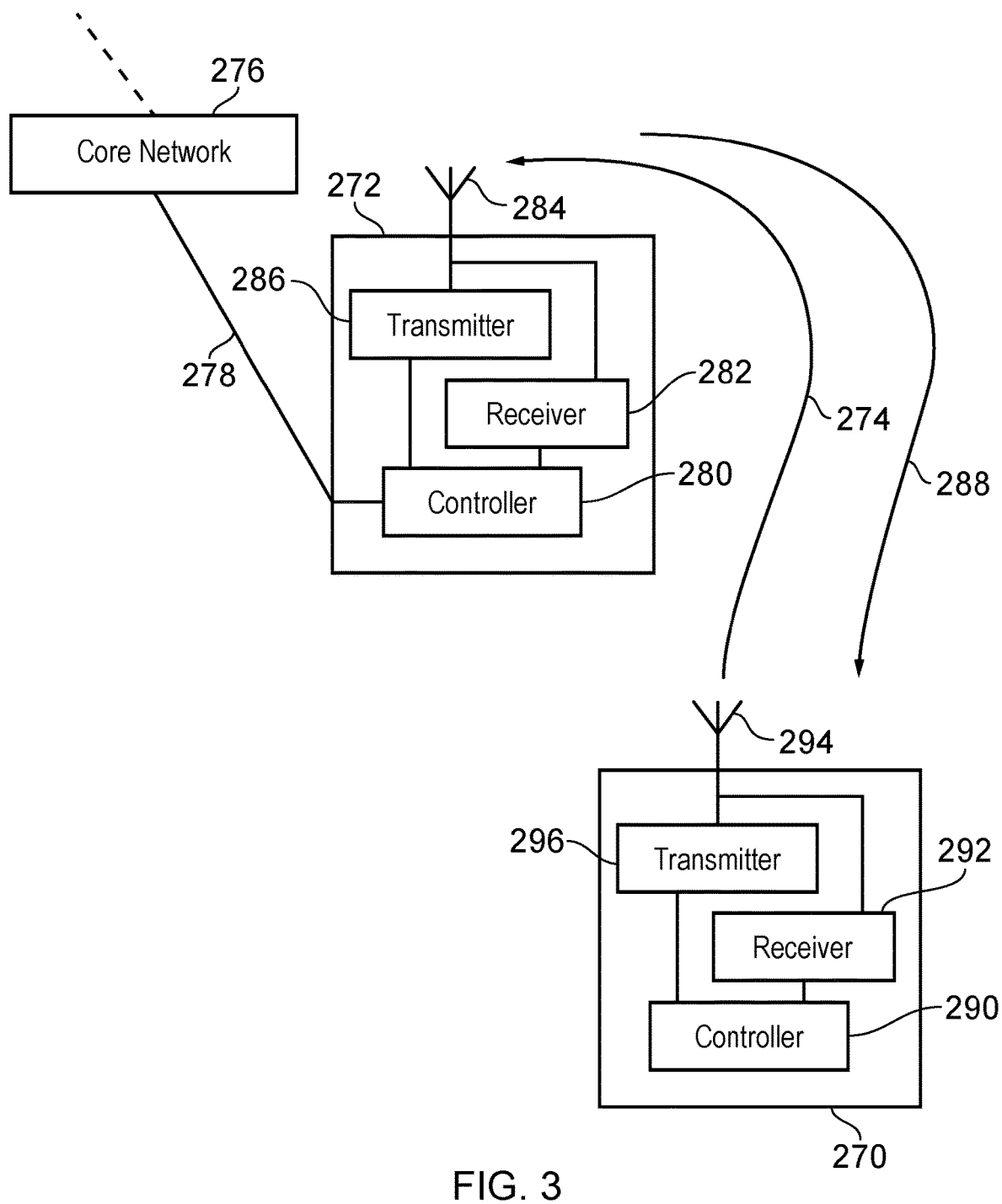
FIG. 3 is a schematic block diagram of an example infrastructure equipment and communications device configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Half Duplex Frequency Division Duplexing (HD-FDD)

Duplex communications refers to the ability of a device to both transmit and receive data. For example, a communications device (such as the communications device 270 of FIG. 3) may communicate in a duplex manner with the infrastructure equipment 272 by transmitting signals 274 to the infrastructure equipment 272 and by receiving signals 288, transmitted by the infrastructure equipment 272.

Frequency Division Duplexing (FDD) is a known technique to allow duplex communication, whereby transmissions by a communications device use communication resources at a first frequency, and transmissions to the communications device (which are received by the communications device) use communication resources at a second frequency. The transmission and reception frequencies are separated by a frequency offset. In a wireless communication network where FDD is used for communications between an infrastructure equipment and a communications device, downlink and uplink communications occur at different frequencies. This is in contrast to Time Division Duplexing (TDD) whereby uplink and downlink communications occur at different times (but may occur at the same carrier frequency).

Duplex communications can either be full duplex (FD) or half-duplex (HD). Where transmission and reception for a device occurs simultaneously (i.e. overlapping in time), this is referred to as full duplex communications. In half-duplex communications, transmission and reception do not overlap in time.

It will be readily appreciated that the complexity of a communications device which is required to perform only half duplex communication (and is not required to be capable of full duplex communication) may be reduced, compared with one which is required to be capable of full duplex communication.

Accordingly, there is an interest in providing for half-duplex communication, in order to permit a reduced complexity of the communication device [3].

In accordance with some embodiments described herein, FDD may be implemented in a communications device which is capable of half duplex communications and which is not capable of full-duplex communications.

Such a communications device may be referred to as a Half Duplex Frequency Division Duplexing (HD-FDD) device.

When operating with half duplex, i.e. according to HD-FDD principles, a communications device (which may be an HD-FDD device or may simply be operating according to HD-FDD principles) may be able to switch between transmission and reception independently of other communications devices in the same cell.

However, in a communication system, some communications devices may be full duplex-capable, and/or the wireless access interface may be arranged in order to allow full duplex communication for at least some communication devices. Additionally or alternatively, existing standards and/or equipment may assume that all communications devices are full duplex-capable.

For example, in accordance with conventional principles for the operation of a 5G NR wireless access interface, first communication resources may be allocated for the reception of signals by a communications device, and second communication resources may be allocated for the transmission of signals by the communications device, which are adjacent in time (or separated by a small duration).

Although this arrangement is strictly compliant with the requirements for an HD-FDD communications device, the inventors of the present technique have identified a need for a communications device which is not required to be full duplex-capable (such as an HD-FDD device), and infrastructure equipment which can operate using a wireless access interface which is suitable for both communications devices which are full duplex-capable and communications devices which are not full duplex-capable.

A communications device which is not required to be capable of full duplex communication may realise a reduction in complexity by, for example, reducing a number of oscillators, such that a single oscillator may be used for both transmission and reception. The oscillator may be associated with an oscillator frequency switching time period during which its output frequency is unstable and therefore neither transmission nor reception is possible. Alternatively or additionally (and irrespective of a number of oscillators used), there may be a minimum time required to effect a switch in the communications device between a transmit path and a receive path. During this minimum time (which may overlap with the oscillator frequency switching time period, if applicable) there may be a minimum time period during which neither transmission nor reception is possible.

There may thus arise a situation where first and second communication resources to be used by the communications device are at different frequencies and do not overlap in time, thereby complying with the strict requirements for a half-duplex FDD device. However, these resources may not be sufficiently separated in time to permit the communications device to switch its operation from using the first communication resources to using the second communication resources.

In general, communication resources which are allocated to a same communications device and which are separated in time by less than a predetermined maximum switching time threshold are herein referred to as 'conflicting' communication resources. Communication resources may be conflicting because one finishes at the same (nominal) time as another starts, i.e. the separation in time is zero. Communication resources may also conflict because the communication resources overlap in time (e.g. because of timing advance requirements, and/or because of a relative offset in uplink and downlink timebases).

In some embodiments, the predetermined maximum switching time threshold may be equal to twice the duration of a symbol period for the wireless access interface.

Accordingly, there is a need to address the problem of how a communication device is to behave when communication resources which are allocated to it are conflicting. In some embodiments of the present technique, the communications device is an HD-FDD device which is not capable of simultaneous operation (and in particular, transmit and receive operations) at different carrier frequencies. However, the present disclosure is not so limited, and techniques disclosed herein may be applied by a communications device which is capable of simultaneous operation (and in particular, transmit and receive operations) at different carrier frequencies.

To address the above problem for LTE in certain cases, when switching from transmit to receive operations (or vice versa) where the allocated, or selected, communication resources are non-overlapping but are (nominally) adjacent in time, a switching time gap be defined. The switching time gap extends for a switching time gap duration which is predefined and its start time is determined based on whether the uplink communication resources are on a physical uplink control channel (PUCCH) or on a physical uplink shared channel (PUSCH). The switching time gap overlaps in time with either or both of the transmit and receive communication resources. The predefined switching time gap duration is equal to two orthogonal frequency division multiplexing (OFDM) symbol periods.

During the switching time gap, the communications device is not required to transmit or receive signals on the wireless access interface. The portions of the transmit and receive communication resources which overlap in time with the switching time gap, and which are therefore not required to be used by the communications device, are referred to herein as being 'punctured'.

As used herein, the term 'switching time gap' refers to a period when the communications device is not required to transmit or receive signals on the wireless access interface. It will be appreciated that in some embodiments a communications device may be capable of performing the switching in a time that is shorter than the switching time gap and may accordingly perform transmission or reception of signals on the wireless access interface during a portion of the switching time gap.

Transmission and reception using the parts of the transmit and receive communication resources which do not overlap in time with the switching time gap may be carried out in a conventional manner (e.g. as specified for a FD-FDD-capable device).

Figure 4:
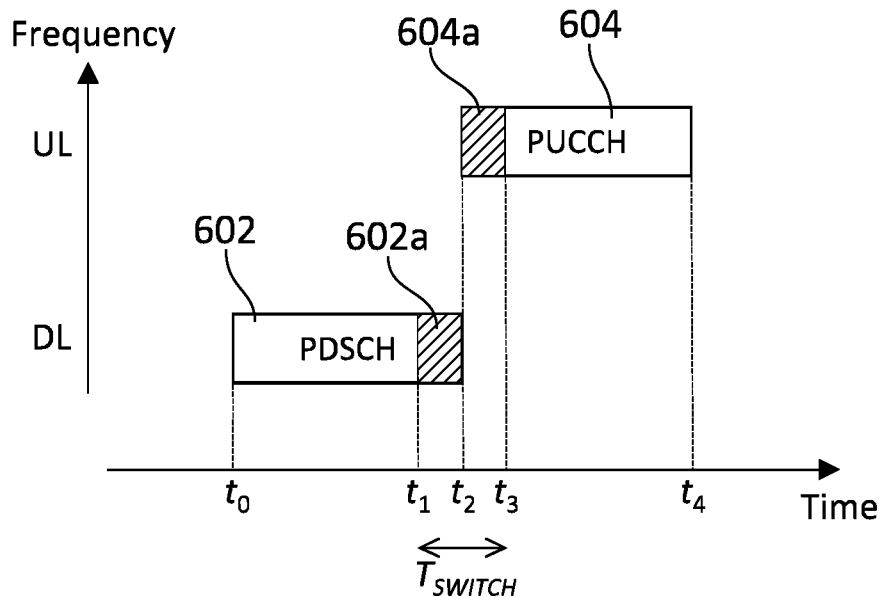
FIG. 4 shows a switching time gap according to certain proposals.

FIG. 4 shows the switching time gap $T_{SWITCH}$ according to certain proposals, when an HD-FDD communications device is allocated first communication resources 602 of a physical downlink shared channel (PDSCH) for reception of signals on a wireless access interface, which extend in time from time t0 to time t2. The communications device is also allocated (or selects, in accordance with conventional techniques) second communication resources 604 of a PUCCH for transmission of signals on the wireless access interface, which extend in time from time t2 to time t4.

In accordance with the proposals, where the transmit communication resources are allocated on a PUCCH, the last OFDM symbol of the earlier resources, and the first OFDM symbol of the later resources are punctured, providing a switching time gap of two OFDM symbols. Where the transmit communication resources are allocated on a PUSCH, two OFDM symbols of those resources are punctured to provide the switching time gap of two OFDM symbols. Where the transmit communication resources precede the receive communication resources, the last two OFDM symbols of the PUSCH resources are punctured, and where the transmit communication resources follow the receive communication resources, the first two OFDM symbols of the PUSCH resources are punctured.

In the example of FIG. 4, because the transmit resources are on PUCCH, the switching time gap extends over the last OFDM symbol 602a of the first communication resources 602 (i.e. from time t1 to time t2) and over the first OFDM symbol 604a of the second communication resources 604 (i.e. from time t2 to time t3).

The inventors of the present disclosure have identified certain shortcomings in the present proposals. In particular, there has been identified a problem that communications resources may be punctured leading to a decreased reliability of transmission using those resources.

Embodiments of the present technique can provide a method of operating a communications device, the method comprising determining that first communication resources are allocated for one of transmission and reception of signals by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a first priority associated with the first communication resources, determining a second priority associated with the second communication resources, determining a start of a switching time gap based on the first priority and the second priority, controlling a receiver of the communications device to refrain from receiving signals during the switching time gap, controlling a transmitter of the communications device to refrain from transmitting signals during the switching time gap, and transmitting or receiving first data using at least a portion of one of the first and second communication resources.

Accordingly, embodiments of the present technique can avoid puncturing being applied to communication resources which are used for the transmission of relatively high priority data.

Conventional techniques permit the explicit assignment of priorities to uplink transmissions, for both shared channel (PUSCH) transmissions and control channel (PUCCH) transmissions. These techniques provide a mechanism to indicate to a communications device which, of two conflicting uplink transmissions, it should prioritise. This can permit an appropriate resolution of conflicting resource allocations or selections, for example where two or more uplink transmissions, which may be associated with different types of services, cannot be carried out due to a conflict (e.g. overlap) of their respective communication resources.

An infrastructure equipment can indicate one of two priority levels (referred to as "L1 priority") in downlink control information, as follows:

For PUSCH transmissions, the L1 priority is indicated in a DCI which also indicates the allocated PUSCH resources;

For PUCCH transmissions (which conventionally carry acknowledgement information relating to an earlier PDSCH transmission), the L1 priority is indicated in a DCI which also indicates the resources allocated for the PDSCH transmission.

Proposals for the determination of the switching time gap may result in resources allocated for transmissions associated with a high L1 priority being subject to puncturing, which will affect their reliability.

According to some embodiments of the present technique, the determination of the switching time gap is based on L1 priority indications associated with one or both of the first and second communication resources.

In some such embodiments, where L1 priority indications are associated with both of the first and second communication resources, the switching time gap is within (and, in some embodiments, aligned with an end of) the duration of the communication resources having the lower priority L1 priority indication. In some such embodiments, the switching time gap does not overlap the communication resources having the higher priority L1 priority indication.

Figure 5:
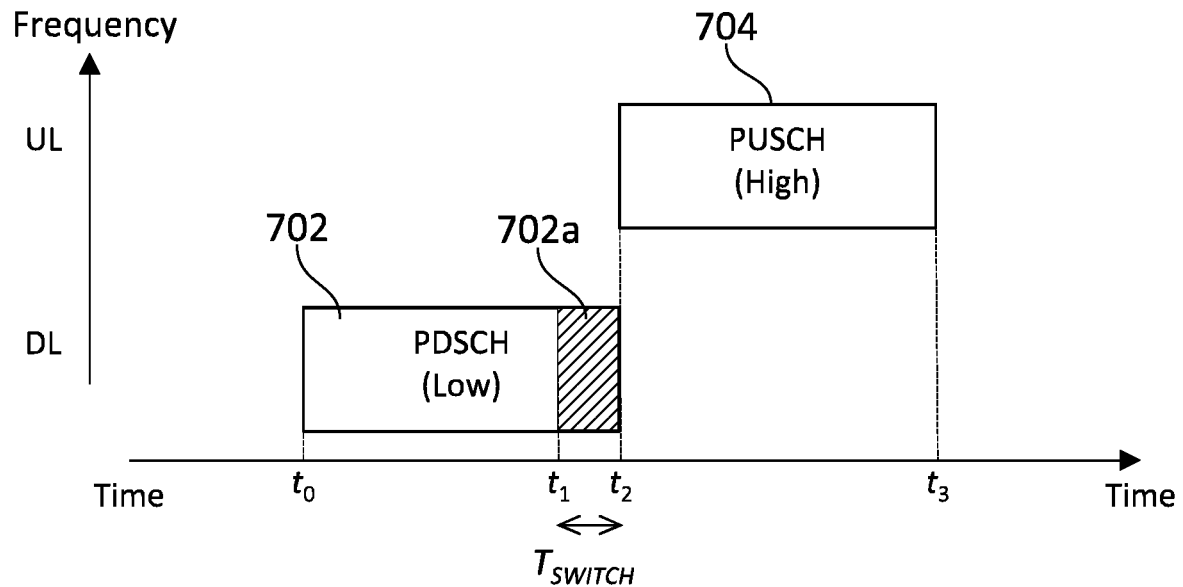
FIG. 5 shows an arrangement of a switching time gap in accordance with embodiments of the present technique.

FIG. 5 shows an arrangement of a switching time gap in accordance with embodiments of the present technique.

FIG. 5 shows an example of conflicting first and second communication resources 702, 704. The first communication resources 702 (which extend from time t0 to time t2) are associated with a low L1 priority, and the second communication resources 704 are associated with a high L1 priority.

Accordingly, the switching time gap occurs during the time period from t0 to t2, and more specifically, occurs from time t1 to time t2, where (t2−t1) is equal to the switching time gap duration $T_{SWITCH}$.

In some embodiments, and in accordance with conventional techniques, no L1 priority is associated with communication resources for downlink transmissions on a shared channel such as a PDSCH. In some such embodiments, where the downlink communication resources are allocated for the transmission of data, a priority for such communication resources is determined based on an L1 priority associated with uplink resources allocated for the transmission of acknowledgement information associated with the data. For example, where downlink communication resources are allocated on a PDSCH for the transmission of data, and uplink resources are allocated on a PUCCH for the transmission of acknowledgement information indicating whether the data was successfully received, the priority for the downlink communication resources allocated on the PDSCH may be equal to the L1 priority associated with the uplink resources are allocated for the PUCCH.

Accordingly, in such embodiments, a priority can be determined for downlink communication resources, and based on that priority, a time of a switching time gap can be determined.

In some embodiments, an L1 priority is associated explicitly with the communication resources for downlink transmissions. For example, the L1 priority associated with the communication resources for downlink transmissions may be indicated in downlink control information which allocates the communication resources. Accordingly, separate priorities may be applicable to resources used for downlink transmissions and those used for uplink transmissions of control information such as acknowledgement information.

In some embodiments, if there is no priority associated with the first and second communication resources, or the priorities are equal, then the switching time gap spans a portion of both communication resources.

Figure 6:
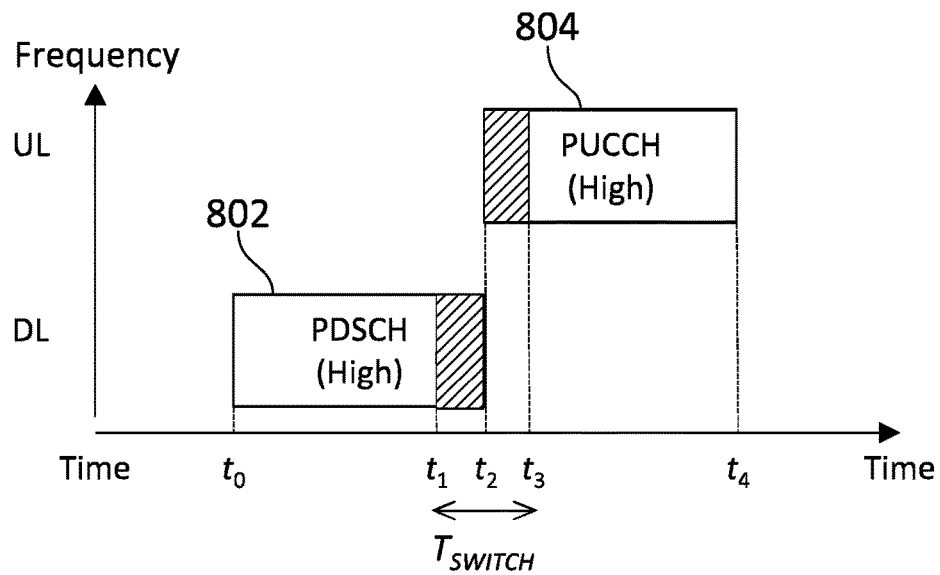
FIG. 6 shows an arrangement of a switching time gap spanning a portion of conflicting communication resources in accordance with embodiments of the present technique.

FIG. 6 shows an arrangement of a switching time gap spanning a portion of conflicting communication resources in accordance with embodiments of the present technique.

In the example of FIG. 6 both the first communication resources 802 and the second communication resources 804 are associated with the same (high) priority. In accordance with embodiments of the present technique, the switching time gap $T_{SWITCH}$ overlaps both the first and second communication resources.

In the example of FIG. 6, the switching time gap corresponds to the last symbol period of the first communication resources 802 (from time t1 to time t2), and the first symbol period of the second communication resources 804 (from time t2, to time t3) and thus extends from time t1 to time t3.

In some embodiments, priorities are associated with communication resources based on an order in which indications of allocations of those communication resources are transmitted.

In some such embodiments, these priorities may be used to determine the switching time gap only if L1 priorities (or other explicitly or implicitly associated priorities) associated with the communication resources are equal.

Figure 7:
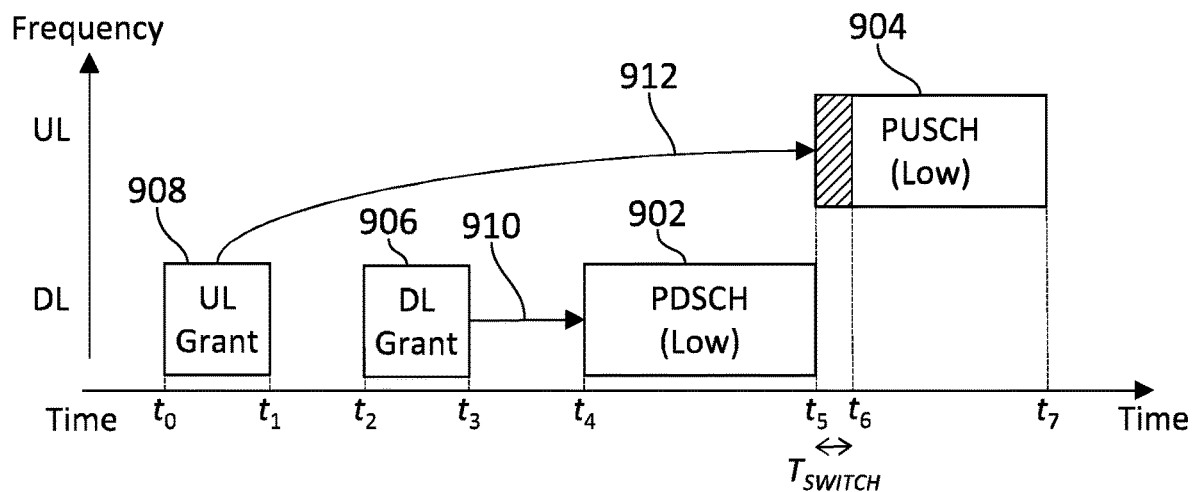
FIG. 7 shows an arrangement of a switching time gap arranged based on a timing of the transmission of resource grants in accordance with embodiments of the present technique.

FIG. 7 shows an arrangement of a switching time gap arranged based on a timing of the transmission of resource grants in accordance with embodiments of the present technique.

FIG. 7 illustrates first and second communication resources 902, 904. The first communication resources 902 end at time t5, and the second communication resources 904 start at time t5. Both the first and second communication resources 902, 904 are assigned a L1 priority of 'low'.

The first communication resources 902 are on a PDSCH for the transmission of downlink data to the communications device, and are allocated (as indicated by arrow 910) by a downlink grant 906, which is transmitted from time t2 to time t3. The second communication resources 904 are on a PUSCH for the transmission of uplink data by the communications device, and are allocated (as indicated by arrow 912) by an uplink grant 908, which is transmitted from time t0 to time t1.

Because the L1 priorities associated with the first and second communication resources 902, 904 are the same, the priorities used to determine the switching time gap are determined based on the order of transmission of the respective allocation messages 906, 908. In the example of FIG. 7, the transmission of the uplink grant 908 precedes the transmission of the downlink grant 906 and accordingly, for the purposes of determining the switching time gap, the second communication resources 904 are associated with a lower priority than the first communication resources 902. Accordingly, the switching time gap $T_{SWITCH}$ does not overlap the first communication resources 902, but overlaps the second communication resources 904 and starts at time t5.

Accordingly, embodiments of the present technique can determine a switching time gap such that no modification is made to communication resources which are allocated later. Typically, a later scheduled transmission that starts earlier than a previously scheduled transmission may be deemed to be more urgent, and embodiments of the present technique can therefore avoid modification to resources associated with the more urgent transmission.

In some embodiments, the priorities used to determine the switching time gap are determined based on the order of transmission of the respective allocation messages and irrespective of any other priorities (such as the L1 priority). In particular, in some embodiments, the priorities used to determine the switching time gap are determined based on the order of transmission of the respective allocation messages if priorities are not explicitly indicated by the infrastructure equipment.

In some embodiments, where both first and second communication resources are associated with a same priority level (such as a same L1 priority), the selection of the switching time gap is determined based on the priority level.

For example, in some embodiments, where the same priority level is a high priority, the switching time gap overlaps in time with a portion of each of the first and second communication resources, for example in the manner illustrated in FIG. 6 above.

In some embodiments, where the same priority level is a low priority, the switching time gap overlaps in time with a portion of only one of the first and second communication resources, for example in the manner illustrated in FIG. 5 above.

Accordingly, where priorities associated with both resources are high, a moderate decrease in probability of successful transmission and reception is incurred by both transmissions. In other words, a large decrease in probability of successful transmission and reception is avoided for both of the transmissions. Where priorities associated with both resources are low, a relatively large decrease in probability of successful transmission and reception is incurred by one of the transmissions, while there is no impact on the other transmission. Although this may result in an unacceptably large probability of failure in respect of one transmission, this may be acceptable in light of the low priority of the transmission.

In some embodiments, the switching time gap is determined by the communications device based on one or more explicit indications transmitted by the infrastructure equipment. For example, a switching gap indication may be included in downlink control information (DCI) which allocates the first or second communication resources. In some embodiments, the switching gap indication may be included in radio resource control signalling.

The switching gap indication may indicate one or more of the following:
whether the switching time gap is to overlap in time with only one of the communication resources, or with both of the communication resources;
if the switching time gap is to overlap in time with only one of the communication resources, which of the communication resources does it overlap with.

The switching gap indication may indicate that the determination of which of the communication resources the switching time gap overlaps with is to be based on:
whether the first or the second communication resources are uplink or downlink resources;
the L1 priority associated with the first and second communication resources;
the order of transmission of indications of the allocation of the first and second communication resources.

In some embodiments, the communications device may receive multiple switching gap indications which are applicable to the same pair of conflicting communication resources.

In some embodiments, if multiple switching gap indications indicate different switching time gaps, the switching time gap is determined based on the most recently transmitted of the multiple switching gap indications.

For example in FIG. 7, if the uplink (UL) Grant 908 transmitted at time t0 comprises a first switching gap indication which indicates that the switching time gap is to overlap a downlink transmission and the downlink (DL) Grant 906, which is transmitted later at time t2, comprises a second switching gap indication which indicates that the switching time gap is to overlap with the PUSCH resources, the communications device determines the switching time gap based on the instruction of the DL Grant 906, since it is the latest instruction from the infrastructure equipment.

Correspondingly, in some embodiments, the infrastructure equipment may initially allocate (by means of, for example, the UL grant 908) the uplink resources 904. At the time of this allocation, no conflicting downlink resources are allocated for the communications device, and the infrastructure equipment may indicate that the switching time gap is to overlap any (subsequently allocated) downlink resources. Subsequently, the infrastructure equipment may determine that downlink data is to be transmitted to the communications device and may, in response, allocate by means of the DL grant 906 the downlink resources 902. The infrastructure equipment may determine (after the transmission of the UL grant 908) that the uplink resources 904 and the downlink resources 902 are conflicting and that the switching time gap should be located so as to overlap in time with the uplink resources 904. Accordingly, in the downlink grant 906, the infrastructure equipment indicates that the switching time gap should be located so as to overlap in time with the uplink resources 904.

In some embodiments, the determination of the switching time gap is based on one or more switching gap indications in combination with one or more other parameters disclosed herein.

In some embodiments, data to be transmitted using the first or second communication resources is transmitted using a repetition scheme, whereby the same data is also transmitted using third communication resources. The use of a repetition scheme may provide a relatively low complexity means for improving the reliability of receiving the data. The repetitions may be based on a different encoding of the same underlying data. For example, the encoding versions may correspond to redundancy versions defined for conventional hybrid automatic repeat-request (HARQ) processes.

In some embodiments of the present technique, where data to be transmitted using the first or second communication resources is transmitted using a repetition scheme, then the switching time gap is arranged to overlap in time with those communication resources used for the data transmitted using the repetition scheme.

Embodiments of the present technique can therefore avoid a decrease in reliability of a transmission, where that transmission is not part of a repetition scheme. Although the switching time gap may result in a failure to transmit or receive certain signals, the underlying data which may be represented by these signals may be obtained by means of decoding an earlier or subsequent repetition of the data transmission.

In some embodiments, the switching time gap is determined so as to avoid the switching time gap overlapping in time with a transmission of reference signals. In some embodiments, the reference signals are demodulation reference signals (DMRS). The reference signals may be transmitted using the first or second communication resources and may be transmitted by the communications device or by the infrastructure equipment.

For example in some embodiments, the second (later-occurring) communication resources may be uplink resources on a PUSCH where, in accordance with a conventional techniques, DMRS are transmitted by the communications device during the first OFDM symbol. In some such embodiments, the switching time gap is arranged to finish prior to the first OFDM symbol of the uplink resources.

In some embodiments, the DMRS are transmitted in a different OFDM symbol, such as a second or third OFDM symbol, in which case in accordance with embodiments of the present technique, the switching time gap is arranged to end prior to the first OFDM symbol used for the transmission of the DMRS.

In accordance with some embodiments the later communication resources may be allocated in accordance with a scheme whereby the start of the communication resources (in the time domain) is not restricted to a specific OFDM symbol. In a specific example, the later communication resources may be allocated on a conventional 'Type B' PUSCH, where DMRS are conventionally transmitted using the first OFDM symbol of the allocated resources.

Where the earlier-occurring of the first and second communication resources are for uplink transmission, the switching time gap is, in some embodiments, arranged so as not to overlap a time when reference signals are to be transmitted using the uplink communication resources. For example, where the reference signals are to be transmitted using a last symbol of uplink communication resources, the switching time gap is arranged to start after the end of the last symbol of the uplink communication resources.

Where the earlier-occurring of the first and second communication resources are for uplink transmission, the switching time gap is, in some embodiments, arranged so as not to overlap a time when reference signals are to be transmitted using the downlink communication resources. For example, where the reference signals are to be transmitted using the first symbol of downlink communication resources, the switching time gap is arranged to end within the uplink communication resources and/or prior to the start of the downlink communication resources.

Accordingly, embodiments of the present technique can avoid a situation where a communications device refrains from transmitting reference signals due to the timing of the switching time gap. These embodiments can thus ensure that the receiver of the transmission receives the reference signals and is thus able to reliably decode the other signals transmitted with the reference signals.

Figure 8:
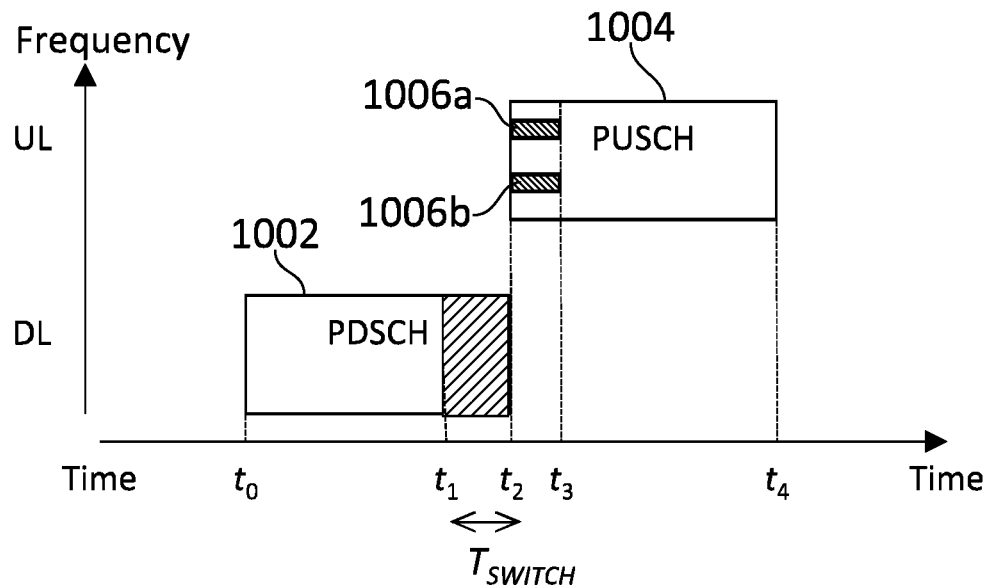
FIG. 8 shows an example of an arrangement of a switching time gap in accordance with embodiments of the present technique, wherein the switching time gap is arranged to avoid a conflict with reference signals.

FIG. 8 shows an example of an arrangement of a switching time gap in accordance with embodiments of the present technique, wherein the switching time gap is arranged to avoid a conflict with reference signals.

In the example of FIG. 8, a communications device is allocated first communication resources 1002 which end at time t2, and second communication resources 1004, which begin at time t2.

The second communication resources 1004 are allocated for the transmission of signals representing data and reference signals. The reference signals 1006a, 1006b are to be transmitted during the time period from time t2 to time t3, which may correspond to a first OFDM symbol, where the resources are allocated on an OFDM-based wireless access interface.

If the switching time gap were to extend later than time t2, some or all of the reference signals 1006a, 1006b may not be transmitted by the communications device. Accordingly, the reliability of the transmission using the second communication resources 1004 may be significantly reduced.

In accordance with embodiments of the present technique, the switching time gap is therefore arranged to finish no later than time t2 when the reference signals 1006a, 1006b are to be transmitted. In the example of FIG. 8, therefore, the switching time gap $T_{SWITCH}$ is arranged to end at time t2.

In some embodiments, where one of the first and second communication resources are uplink communication resources, and the other of the first and second communication resources are downlink communication resources, the switching time gap is arranged not to overlap the uplink communication resources.

Accordingly, embodiments of the present technique can ensure that reference signals are transmitted using the uplink communication resources, thereby ensuring a reliable reception of the signals transmitted using the uplink communication resources.

In some embodiments, both the switching time gap and the signals to be transmitted using the first or second communication resources are arranged in order to avoid an overlap of the switching time gap and a time period during which reference signals are transmitted.

Figure 9:
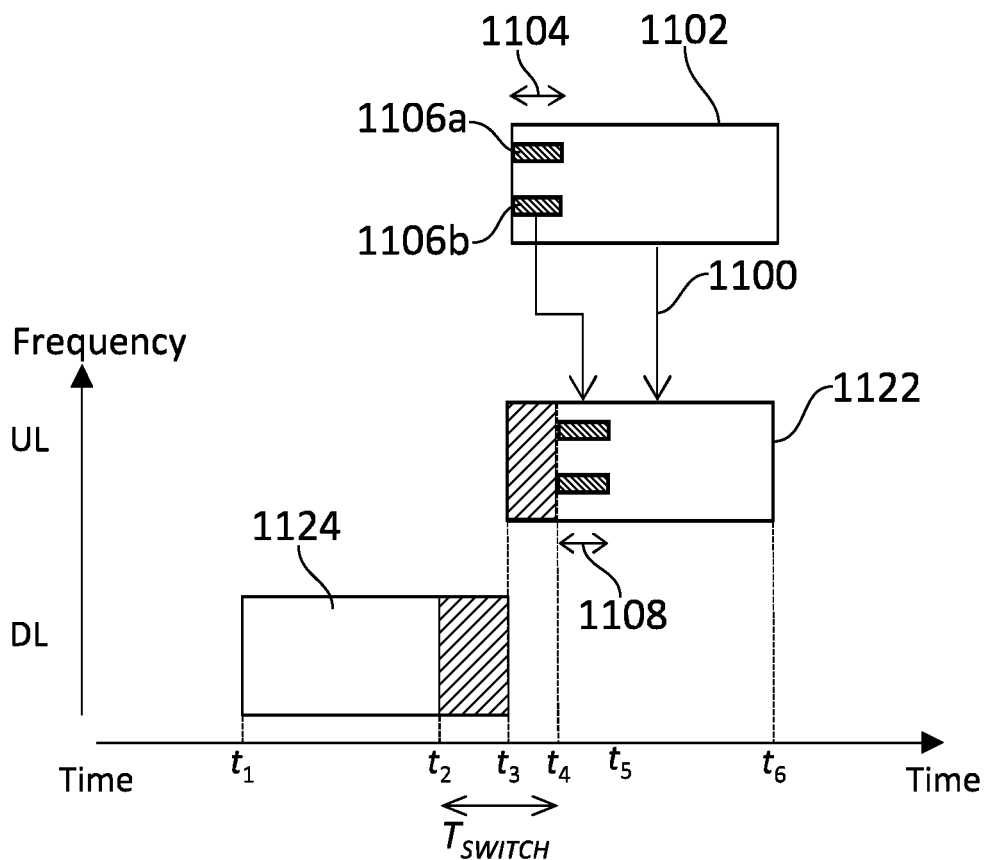
FIG. 9 illustrates an arrangement of signals in accordance with embodiments of the present technique to avoid an overlap of a switching time gap and the transmission of reference signals.

FIG. 9 illustrates an arrangement of signals in accordance with embodiments of the present technique to avoid an overlap of a switching time gap and the transmission of reference signals.

In FIG. 9, first communication resources 1124 are allocated for downlink transmission to the communications device, and second communication resources 1122 are allocated for uplink transmission by the communications device. The end time of the first communication resources 1124 and the start time of the second communication resources 1122 coincide at time t3.

The rectangle 1102 (whose position in FIG. 9 is purely for convenience and clarity) represents a first arrangement of signals which could be transmitted using the second communication resources 1122. In particular, the first arrangement 1102 may represent an arrangement of signals which would be transmitted using the second communication resources 1122, if the first communication resources 1124 were not also allocated for the transmission of data to the communications device. In general, the first arrangement 1102 may represent an arrangement of signals which would be transmitted using the second communication resources 1122, if no other communication resources are allocated to the communications device which are conflicting with the second communication resources 1122.

In accordance with the first arrangement 1102, during a first time period 1104, reference signals 1106a, 1106b are transmitted. In the example of FIG. 9, the reference signals 1106a, 1106b are transmitted using only a portion of the communication resources during the first time period, however it will be appreciated that the present disclosure is not limited in regards to the extent, in the frequency domain, of the reference signals. For example, the second communication resources 1122 may be allocated in accordance with a conventional Type B PUSCH.

In accordance with embodiments of the present technique, the signals transmitted using the second communication resources 1122 are rearranged with respect to the first arrangement 1102 to form a second arrangement, as shown by the arrow 1100.

In the example of FIG. 9, the switching time gap is determined to extend until time t4, which is the end of the first OFDM symbol period of the second communication resources 1122. This determination may be in accordance with any technique, including any of those disclosed herein.

According to the second arrangement, signals of the first OFDM symbol 1104 of the first arrangement 1102 are transmitted during a second symbol 1108 which starts at time t4. In some embodiments, no signals are transmitted during the first symbol (i.e. from time t3 to time t4). Accordingly, reference signals are transmitted during the first symbol after the switching time gap.

In accordance with some embodiments, signals which, according to the first arrangement 1102, would be transmitted during the third to final OFDM symbols, are transmitted during the respective (third to final) symbols of the second communication resources 1122. Accordingly, symbols which do not contain reference signals (or at least, do not contain reference signals which would be transmitted in the first OFDM symbols according to the first arrangement 1102) are transmitted at their conventional location, unless pre-empted by the symbols which contain reference signals and which are shifted in time. In general, if the second communication resources 1122 extend for N symbol periods, the first symbol according to the first arrangement is for transmitting reference signals, and the first M symbols of the second communication resources 1122 overlap the switching time gap, then for i=1 . . . N, the signals to be transmitted in the $i^{th}$ symbol period according to the first arrangement 1102 are transmitted using the symbols of the allocated second communication resources 1122 as follows:

using the $(M+1)^{th}$ symbol period, for i=1
using the $i^{th}$ symbol period, for $(M+1)<i\le N$
not transmitted, for $2\le i\le M$.

It will be readily appreciated that this principle may be applied when, according to the first arrangement, the reference signals are transmitted using symbols other than the first symbol. In general, reference signals are shifted so as not to be scheduled for transmission within the switching time gap, and signals in other symbols are transmitted using the same symbol in the allocated resources, unless that would conflict with a symbol carrying (shifted) reference signals.

In accordance with some other embodiments, all symbols of the first arrangement are shifted. As in the above case, the signals of the first symbol to be transmitted according to the first arrangement 1102 are transmitted during the second symbol (or the first symbol to be transmitted after the switching time gap, if different). All signals which, according to the first arrangement 1102, would be transmitted during the subsequent (e.g. second to penultimate) OFDM symbols are transmitted shifted in time by the same amount, e.g. during the third to final symbols of the second communication resources 1122. In other words, the signals are shifted in time such that if the second communication resources 1122 extend for N symbol periods, and the first M of these overlap the switching time gap, then the signals to be transmitted in the $i^{th}$ symbol period according to the first arrangement 1102 are transmitted using the symbols of the allocated second communication resources 1122 as follows using the $(i+M)^{th}$ symbol period, for i=1 . . . (N-M)
not transmitted, for i>N-M.

Accordingly, embodiments of the present technique can provide improved reliability for transmissions which, in the absence of a conflicting resource allocation, would comprise reference signals by ensuring that, irrespective of a timing of a switching time gap, reference signals are transmitted.

Embodiments can further mitigate any additional complexity by providing for the transmission of other signals which are either transmitted at a same time, irrespective of the timing of the switching time gap (unless subject to 'pre-emption' by shifted reference signals) or are transmitted at a same relative time, relative to the shifted reference signals.

In the example of FIG. 9, certain signals which are included in the first arrangement 1102 are not transmitted using the second communication resources, as a result of the switching time gap overlapping in time the second communication resources.

In some embodiments of the present technique, where a switching time gap is determined which overlaps with an initial portion of allocated communication resources, all of the signals of the first arrangement 1102 are transmitted by using, in addition to the second communication resources 1122, communication resources which follow in time the second communication resources 1122.

Figure 10:
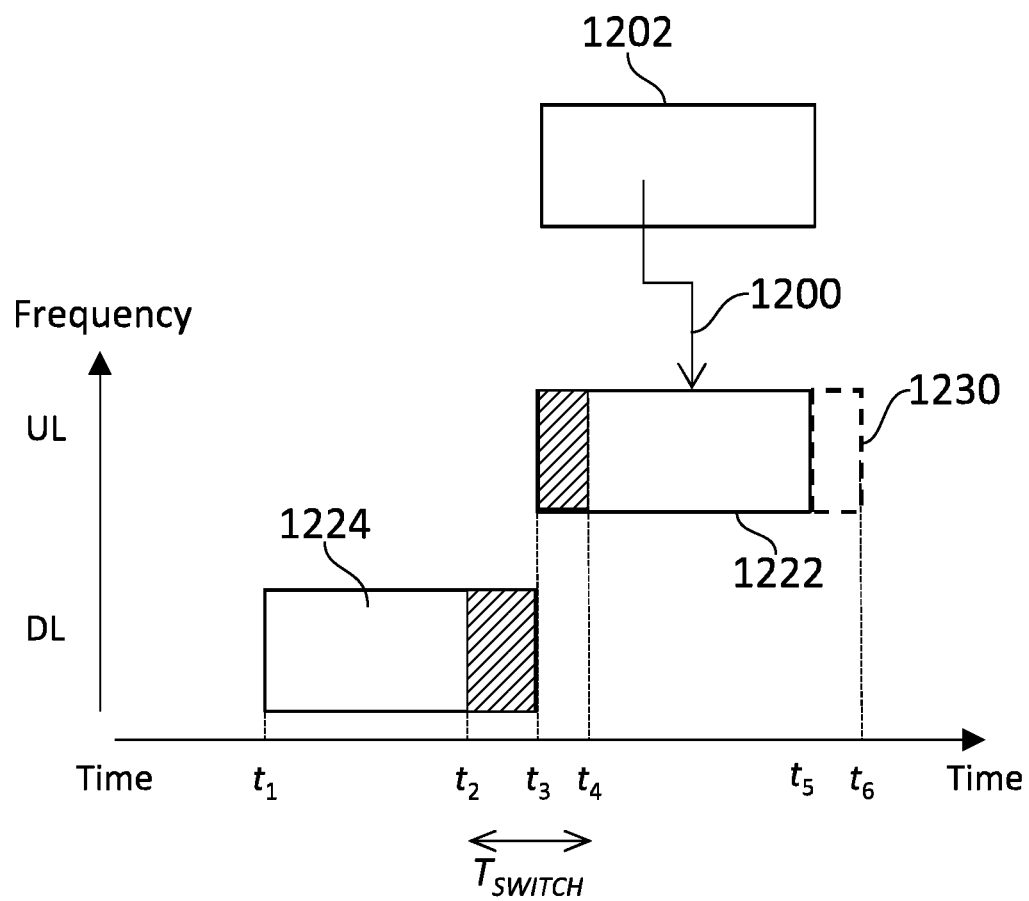
FIG. 10 illustrates an arrangement of signals in accordance with embodiments of the present technique to avoid a reduction in transmission reliability resulting from an overlap of a switching time gap.

FIG. 10 illustrates an arrangement of signals in accordance with embodiments of the present technique to avoid a reduction in transmission reliability resulting from an overlap of a switching time gap.

As in FIG. 9, FIG. 10 shows a first arrangement 1202 of signals which would be transmitted using the second communication resources 1222, which start at time t3 and extend to time t5.

As a result of the allocation of conflicting first communication resources 1224 (which extend from time t1 to time t3), a switching time gap is determined to extend from time t2 to time t4, i.e. overlapping a portion of the second communication resources 1222.

Based on the determined switching time gap, additional communication resources 1230 are identified. These extend over the same frequency range as the second communication resources 1222 and extend in time from the end of the second communication resources 1222 (i.e. from time t5) to time t6, having a duration corresponding to the extent (in time) by which the switching time gap $T_{SWITCH}$ overlaps with the second communication resources. In other words, (t6−t5)=(t4−t3).

In accordance with embodiments of the present technique, all of the signals of the first arrangement 1202 are transmitted using a combination of the portion of the second communication resources 1222 which do not overlap with the switching time gap, and the additional communication resources 1230.

Accordingly, embodiments of the present technique can avoid any reduction in the extent of communication resources which are available for the transmission of signals, resulting from an overlap of a switching time gap and allocated communication resources.

In some such embodiments, the switching time gap is determined to start at the beginning of the second communication resources 1222. Accordingly, the duration of the additional communication resources 1230 is equal to the switching time gap $T_{SWITCH}$.

In accordance with some embodiments of the present technique, the wireless access interface is divided in time into timeslots, which are further divided into symbols, which may be, for example, OFDM symbols or SC-FDMA symbols. In some such embodiments, the additional communication resources (such as the additional communication resources 1230 of FIG. 10) extend into, or occur within, a timeslot which is different from that which contains the second communication resources 1222.

Disclosed herein are various arrangements for transmitting signals when it is determined that a switching time gap overlaps communication resources which would have otherwise (i.e. in the absence of the overlap) been used to transmit those signals. In some embodiments of the present technique, an infrastructure equipment may transmit an indication of which of a plurality of such arrangements are to be used by the communications device. The indication may be transmitted in downlink control information, or in RRC configuration signalling.

In some embodiments of the present technique, the switching time gap overlaps only the longer of the conflicting communication resources.

Accordingly, embodiments of the present technique can result in a lower proportion of either communication resources being unavailable as a result of the switching time gap. For example, if the conflicting communication resources comprise PUSCH resources which extend in time over 4 symbols and PDSCH resources having a duration of 14 symbols, and $T_{SWITCH}$ is 1 symbol in duration, then the switching time gap is arranged to overlap only the PDSCH resources. In this example, the downlink resources are reduced by only around 7%, whereas if the switching time gap were arranged to overlap the PUSCH resources, these resources would have reduced by a greater proportion (25%). Depending on the nature of the encoding, and assuming that the encoding results in at least some redundancy, the probability that the signals transmitted using each of the conflicting communication resources are decoded to arrive at the correct unencoded data is accordingly increased.

In some embodiments, the switching time gap overlaps only the one of the conflicting communication resources with which data is to be encoded using the lower coding rate. Accordingly, embodiments of the present technique can ensure that the reduction in available communication resources is applied where the effect on a probability of incorrectly decoding the data, in spite of the reduction, is reduced.

In some embodiments, the switching time gap overlaps only the one of the conflicting communication resources with which data is to be encoded using the higher coding rate. This reflects the possibility that where data is to be transmitted with a (relatively) low coding rate, the reliability of transmission of that data is (relatively) more important. For example, data associated with the URLLC service may be required to be transmitted with high reliability and thus may be encoded with a correspondingly lower coding rate. Accordingly, embodiments of the present technique can ensure that the transmission of data where reliability of transmission is (more) important is not affected by the switching time gap.

In some embodiments, it may be determined that the conflicting communication resources are separated by a separation gap of non-zero duration. In some such embodiments, the switching time gap may be aligned so as to overlap entirely the separation gap. Accordingly, for example, where it is determined that the switching time gap is not to overlap in time with the later of the first and second conflicting communication resources, the switching time gap may be located so that the end of the switching time gap and the start of the later conflicting resources are aligned.

In some embodiments, the communications device transmits a switching time gap indication to the infrastructure equipment, the switching time gap indication indicating the location in time of the switching time gap.

This transmission may be using resources which are not either of the conflicting communication resources, for example using separate physical uplink control channel (PUCCH) resources, or may be included within an uplink transmission using either the first or second conflicting communication resources. For example, where one of the first or second conflicting communication resources are allocated on a PUSCH, the switching time gap indication may be within uplink control information (UCI) transmitted using the allocated PUSCH resources.

Accordingly, embodiments of the present technique can allow the communications device to determine autonomously the location of the switching time gap and/or avoid the need for the infrastructure equipment to determine by other means (e.g. by implementing any of the other techniques disclosed herein) the location in time of the switching time gap.

In some embodiments, the infrastructure equipment may adapt its subsequent behaviour based on the determined switching time gap location. The infrastructure equipment may determine the switching time gap location in accordance with any of the techniques disclosed herein, or may determine it based on a received switching time gap indication.

In some such embodiments, for example, the infrastructure equipment may adapt a control loop, such as a CQI outer loop, for assessing channel conditions (and, thus, for selecting appropriate modulation and coding scheme parameters) based on the determined switching time gap location. For example, in response to receiving a negative acknowledgement indicating that the communications device had failed to decode data transmitted using allocated downlink communication resources, the infrastructure equipment may update its channel condition assessment in a manner which depends on whether or not the switching time gap overlaps a portion of the downlink communication resources. In some embodiments, for example, the infrastructure equipment may make no update to its channel condition assessment if the switching time gap is determined to overlap a portion of the downlink communication resources.

Accordingly, channel estimations and/or modulation and coding scheme control may be adapted to account for the effect of an overlap of a switching time gap with allocated resources. This may avoid, for example, an inappropriate determination by the infrastructure equipment in response to a negative acknowledgement transmitted by the communications device, where the failure to receive the data resulted from the overlap of a switching time gap with communication resources used for the transmission of the data.

In some embodiments, the wireless access interface may be divided in the frequency domain into different portions, or bandwidth parts (BWP). The BWPs may be contiguous or separated. The numerology (e.g. subcarrier spacing, cyclic prefix duration) applicable to communication resources may be different, in different BWPs. Accordingly, communication resources may be allocated in a portion (BWP) of the wireless access interface having a numerology appropriate for the nature or requirements of data to be transmitted using the communication resources.

In an OFDM-based wireless access interface, the OFDM symbol duration depends on the subcarrier spacing. Accordingly, the symbol period may be different for different BWPs.

In some embodiments, the switching time gap location is determined based on a BWP within which the conflicting communication resources are allocated. In some such embodiments, the BWP is associated (e.g. by means of RRC configuration) with one or more rules for determining the switching time gap when conflicting communication resources are allocated which are within that BWP.

For example, a first BWP, BWP1 may be associated with a rule that when communication resources allocated within the first BWP are conflicting, then the switching time gap is to be located so as to overlap only downlink communication resources. A second BWP, BWP2, may be associated with a rule that when communication resources allocated within the second BWP are conflicting, then the switching time gap location is to be determined based on the L1 priority.

Accordingly, when the first and second communication resources, which are conflicting, are allocated within a first BWP, BWP1, then the switching time gap may be located so as to overlap only downlink communication resources. In addition, or alternatively, when the first and/or second communication resources are allocated within a second BWP, BWP2, then the switching time gap may be located to overlap the communication resources having a lower priority, determined based on the L1 priority or otherwise.

Accordingly, embodiments of the present technique can provide for the switching time gap location to be controlled by the infrastructure equipment, by selecting a BWP for the allocation of the conflicting resources according to a desired switching time gap location, without further explicit indication.

Rules for selecting a switching time gap location for a particular BWP may be configured by the infrastructure equipment by means of RRC signalling, such as by extending a conventional BWP configuration procedure.

In some embodiments, the duration of the switching time gap, $T_{SWITCH}$ may be (or be determined based on) a predetermined value. This predetermined value may be, or be based on, a capability associated with the communication device and may characterise a maximum duration required for a switch between different frequencies.

Where the predetermined value is expressed in absolute time units (e.g. seconds, or a derivative unit thereof) and the conflicting first and second communication resources are OFDM resources having different symbol periods (for example, on different BWPs, having different subcarrier spacing), then in accordance with some embodiments, the switching time gap is located in time so as to overlap with the communication resources having the longer symbol period. Accordingly, embodiments of the present technique can reduce a number of OFDM symbols which overlap with the switching time gap.

In some embodiments, the communications device may be able to operate using different values of $T_{SWITCH}$ (i.e., different durations of the switching time gap). For example, in a first operating mode, the communications device operates using a first $T_{SWITCH}$ duration and in a second operating mode, the communications device operates using a second $T_{SWITCH}$ duration, which is longer than the first $T_{SWITCH}$ duration.

In some embodiments, the first operating mode may be associated with a higher power consumption, and the second operating mode may be associated with a lower power consumption. For example, in some embodiments, the communications device may comprise two or more local oscillators. In the first operating mode, both local oscillators are used: one at a frequency corresponding to first allocated communication resources, and another at a frequency corresponding to second allocated communication resources. Because there is no need to re-tune a local oscillator during a time gap between the first and second communication resources, the duration of $T_{SWITCH}$ may be relatively low (for example, may be zero).

In some embodiments, in the second operating mode, only one local oscillator is used. As explained above, this may require a switching time gap during which neither transmission nor reception can be reliably carried out, between the first and second communication resources. The duration of $T_{SWITCH}$ may accordingly be higher in the second operating mode than in the first operating mode.

In some embodiments, the communications device may determine the operating mode autonomously.

In some embodiments, a BWP is associated with a particular operating mode, and hence (or otherwise) with a $T_{SWITCH}$ duration. Accordingly, when first and/or second communication resources are allocated within a BWP, the communications device may determine the $T_{SWITCH}$ duration to be applied based on the BWP, for example by determining the operating mode based on the BWP. In some embodiments, the association between $T_{SWITCH}$ and BWP is configured by means of RRC signalling. The duration of $T_{SWITCH}$ may be expressed as a number of symbols.

In some embodiments, the operating mode may depend on whether the communications device is operating in a carrier aggregation mode. For example, when operating in carrier aggregation mode, there may be only one local oscillator available for operations on each carrier and accordingly, the communications device may operate in the second operating mode (at least in respect of that carrier). When operating in a non-carrier aggregation mode (i.e. operating using only a single carrier), two local oscillators may be available and the communications device may operate in the first operating mode.

Accordingly, when first and second communication resources are allocated, the communications device may determine the operating mode based on whether or not carrier aggregation is active (or, if it is, whether two local oscillators are nevertheless available for use on that carrier), and may thus determine the $T_{SWITCH}$ duration to be applied.

Embodiments of the present technique can therefore provide flexibility in the duration of the switching time gap, permitting a trade-off between power consumption and impacts on resources resulting from the switching time gap (which may have corresponding impacts on overall throughput). Embodiments of the present technique can also provide flexibility in the duration of the switching time gap based on a use of carrier aggregation.

Conventionally, a BWP may be associated with a BWP switching time (which may be referred to as an interruption duration for BWP switching), which provides a maximum duration permitted for a communications device to switch from operations (transmit or receive) in one BWP to operations in another BWP. The BWP switching time may be expressed in time slots and may depend on the sub-carrier spacing of the BWPs. For example, the BWP switching time may be 1, 1, 3 and 5 slots for BWPs having sub-carrier spacings of 15, 30, 60 and 120 kHz, respectively. Where the two BWPs have different switching times, the applicable BWP switching time may be that corresponding to the BWP having the larger sub-carrier spacing.

In some embodiments, the duration of $T_{SWITCH}$ may be determined based on the BWP switching time. For example, the duration of $T_{SWITCH}$ may be equal to the BWP switching time.

Due to variation in propagation delays incurred by signals transmitted on the wireless access interface, each communications device may be assigned a timing advance (TA). In order to ensure that signals transmitted in adjacent time periods, by different communications devices, do not overlap in time at the receiver of the infrastructure equipment, each communications device applies its TA to uplink transmissions. For example, a communications device which is located a long way from the infrastructure equipment, and whose uplink transmissions therefore take a relatively long time to reach the infrastructure equipment, may have a higher TA value, and therefore may initiate transmissions sooner than a communications device located close to the infrastructure equipment, even if the transmissions are to begin at the same 'nominal' time.

In other words, the TA is a duration by which uplink transmissions must be offset in time, to compensate for propagation delays.

In some embodiments, the switching time gap location is determined based, at least in part, on the timing advance. In other words, a starting time and duration of puncturing for communication resources may be determined based on at least a duration of the switching time gap and a duration of the timing advance.

Figure 11A:
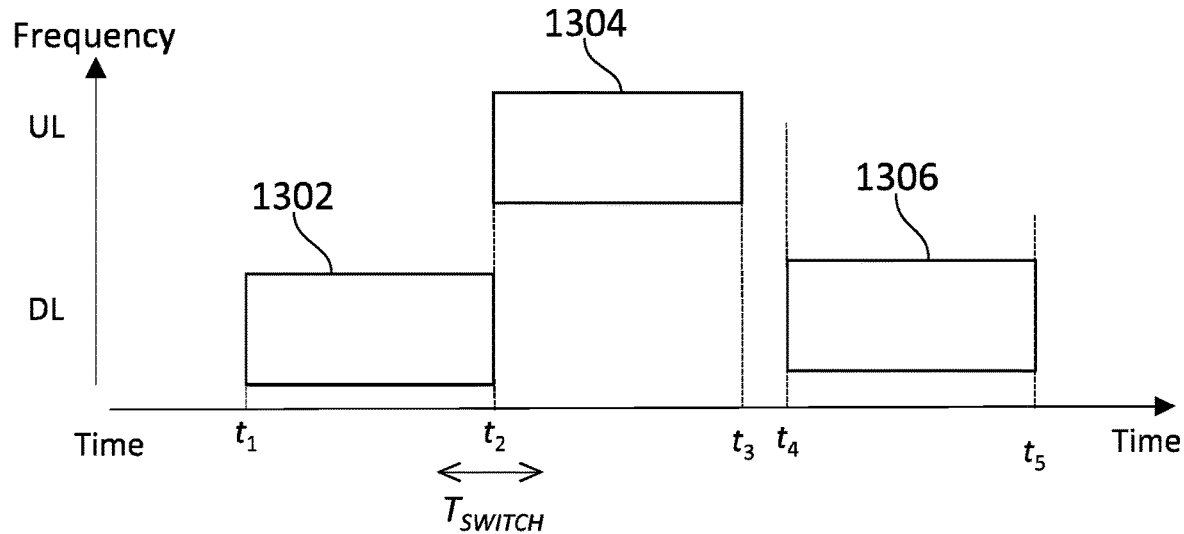
FIG. 11A and FIG. 11B illustrate locations of the switching time gap based on a timing advance in accordance with embodiments of the present technique.
Figure 11B:
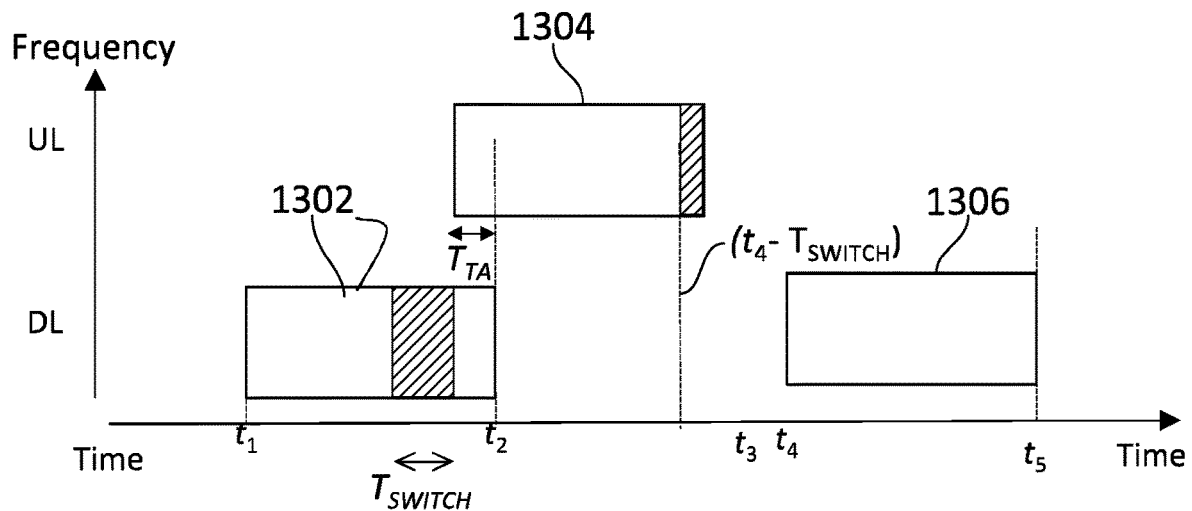

FIG. 11A and FIG. 11B illustrate locations of the switching time gap based on a timing advance in accordance with embodiments of the present technique.

FIG. 11A shows allocated communication resources using a 'nominal' time base, which may be based on (and offset from), for example, a time base at the infrastructure equipment.

In the example of FIG. 11A and FIG. 11B, first communication resources 1302 are allocated for downlink transmission from time t1 to time t2. Second communication resources 1304 are allocated for uplink transmission from time t2 to time t3, and third communication resources 1306 are allocated or downlink transmission from time t4 to time t5.

However, the communications device is required to apply a timing advance having duration $T_{TA}$ to the uplink transmissions. Accordingly, the start of the uplink transmission occurs at time $t2-T_{TA}$, and it finishes at time $t3-T_{TA}$. FIG. 11A shows the timing of the communication resources, after adjusting the time of the uplink communication resources 1304 to account for the timing advance.

Accordingly, the first and second communication resources 1302, 1304 are conflicting, because they in fact overlap in time. Similarly, although the gap between the second and third communication resources 1304, 1306 has increased, the resulting gap remains shorter than a predetermined duration, and thus the resources are conflicting.

Switching time gap locations are determined for each transition. These determinations may be in accordance with any of the techniques disclosed herein, or any other technique.

In the example of FIG. 11B, the first switching time gap between the first and second communication resources 1302, 1304 is located so as not to overlap the uplink communication resources 1304. Accordingly, the switching time gap begins at $(t2-T_{TA}-T_{SWITCH})$ and ends at $(t2-T_{TA})$.

In the example of FIG. 11B, the second switching time gap between the second and third communication resources 1304, 1306 is located so that, after taking advantage of the gap between these resources, the switching time gap does not overlap the downlink communication resources 1306. Accordingly, the switching time gap begins at $(t4-T_{SWITCH})$ and ends at time t4.

As disclosed herein, a switching time gap may overlap with communication resources allocated for the transmission of signals by a communications device, or to a communications device. This may arise as a result of applying techniques disclosed herein, conventional techniques, or for any other reason.

The switching time gap permits the communications device to adjust its operation from operation at a first frequency to operation at a second frequency, and during this time, it may not be expected to receive or transmit signals on the wireless access interface. Accordingly, in some embodiments, the communications device may control its transmitter circuitry and receiver circuitry so that for at least a portion of the switching time gap, it refrains from transmitting on the wireless access interface, and refrains from receiving signals transmitted on the wireless access interface. In some embodiments, signals which are nevertheless received during the switching time gap are not relied upon or used in a decoding process by the communications device.

In some embodiments, the communications device is not capable of transmitting or receiving during at least a portion of the switching time gap. In some embodiments, the communications device is not capable of transmitting or receiving during any of the switching time gap.

In some embodiments, the communications device may, during the switching time gap, perform any operations which it is capable of and which are consistent with a performance requirement wherein according to the performance requirement, the communications device is not required to transmit on the wireless access interface for the duration of the switching time gap, and is not required to receive signals which are transmitted on the wireless access interface during the switching time gap.

In accordance with some embodiments of the present technique, communication resources are used to transmit or receive signals on a 'best effort, unmodified' basis. That is, outside of the switching time gap, the communications device operates as it would if there were no switching gap. During the switching time gap, the communications device may refrain from transmitting or receiving signals, or in some embodiments may refrain from transmitting or receiving signals during a first portion of the switching time gap, and may transmit or receive signals to a limited extent (for example, in accordance with its capabilities), during a second portion of the switching time gap.

In accordance with some embodiments of the present technique, encoding of the data to be transmitted using communication resources which overlap the switching time gap is modified, compared to encoding which would be used if there were no overlap.

For example, in some embodiments, encoding of the data is performed based on the extent of the communication resources which do not overlap the determined switching time gap. This may be referred to as 'rate matching' and is in contrast to the 'best effort, unmodified' basis, where the encoding is performed based on the extent of the allocated communication resources, irrespective of any overlap of the switching time gap.

In some embodiments, a combination of techniques may be applied. For example, referring to FIG. 9, in some embodiments, certain signals which were to be transmitted according to the first arrangement 1102 using a certain symbol are transmitted using a different symbol of the allocated resources 1122. Other resources of the allocated resources 1122 may be used for the transmission of signals which are encoded in a manner based on the extent of the other resources.

For example, referring to FIG. 9, DMRS signals 1106a, 1106b may be transmitted using the second symbol 1108 of the allocated resources 1122. The remaining resources (i.e. those symbols occurring after the second symbol 1108 and, in some embodiments, resources of symbol 1108 not used for DMRS) are used to transmit signals which are generated by encoding the data based on the extent of the remaining resources, i.e. by rate-matching the original data to be transmitted according to the extent of the allocated resources which remain after the removal of those resources which overlap with the switching time gap.

In some embodiments, a dynamic determination is made as to whether signals to be transmitted using resources which overlap a switching time gap are to be encoded using 'rate matching', or are to be transmitted on an 'unmodified' basis.

In some embodiments, where the transmission is by the infrastructure equipment, the dynamic determination is based on when the communications device is able to determine the switching time gap location, relative to the start of the reception of the signals transmitted during the relevant communication resources.

For example, where the switching time gap is determined to overlap with downlink communication resources which conflict with uplink communication resources, the signals transmitted on the downlink communication resources may be encoded using 'rate matching' if the communications device became aware of the conflict at least a predetermined period equal to a downlink rate-matching decision threshold time prior to the start of the downlink communication resources. The communications device may become aware of the conflict after the later of a downlink grant allocating the downlink communication resources and an uplink grant allocating the uplink communication resources have been received. If the communications device became aware of the conflict less than the downlink rate-matching decision threshold time prior to the start of the downlink communication resources, then the signals may be transmitted 'unmodified'.

In some embodiments, where the transmission is by the communications device, the dynamic determination is based on when the communications device is able to determine the switching time gap location, relative to the start of the transmission of the signals transmitted during the relevant communication resources.

For example, where the switching time gap is determined to overlap with uplink communication resources which conflict with downlink communication resources, the signals transmitted on the uplink communication resources may be encoded using rate matching if the communications device became aware of the conflict at least a predetermined period equal to an uplink rate-matching decision threshold time prior to the start of the uplink communication resources, and the signals may be transmitted on an unmodified basis otherwise.

It will be appreciated that in order to reliably decode the data, embodiments of the present technique may require that the receiver of the data determines whether the data has been transmitted using the unmodified basis or using the rate matching basis.

In accordance with embodiments of the present technique, there is therefore provided a method of receiving data, the method comprising determining communication resources allocated for the transmission of the data, determining that the communication resources are conflicting with other communication resources, determining that a switching time gap overlaps with the communication resources, and determining whether the data is transmitted using the communication resources on an unmodified basis or using rate matching. The method further comprises receiving the data and decoding it based on the determining whether the data is transmitted using the communication resources on an unmodified basis or using rate matching.

The determination that the switching time gap overlaps with the communication resources may be in accordance with any of the techniques disclosed herein.

Figure 12:
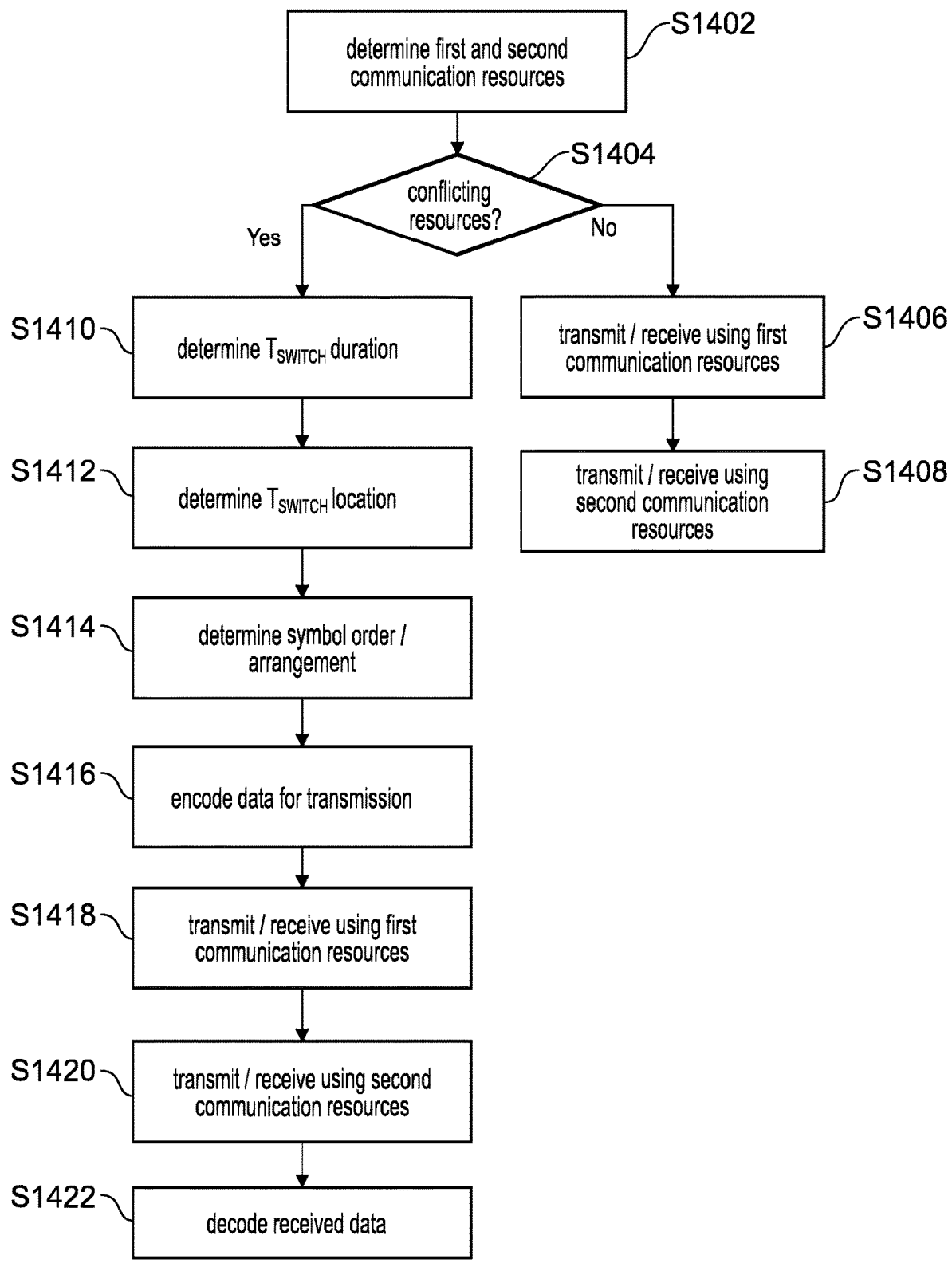
FIG. 12 shows a flow chart for a process which may be implemented by a communications device in accordance with embodiments of the present technique.

FIG. 12 shows a flow chart for a process which may be implemented by a communications device in accordance with embodiments of the present technique.

The process of FIG. 12 starts at step S1402, in which the communications device (such as the communications device 270 of FIG. 3) determines first and second communication resources which are allocated for the transmission or reception of signals by the communications device on a wireless access interface of a communications network. For convenience, in the example of FIG. 12, it is assumed that the first communication resources begin earlier than the start of the second communication resources.

The determination may be may in response to receiving explicit grant indications transmitted by another entity in the communications network, such as the infrastructure equipment 272 of FIG. 3. For example, the grant indications may comprise DCIs transmitted on a PDCCH of the wireless access interface. Alternatively, the determination in respect of one or both communication resources may be made autonomously. For example, the determination may be made in response to determining that data is to be transmitted using resources which are allocated semi-statically (such as by a configured grant) for the communications device to use for transmission.

At step S1404, the communications device determines whether the first and second communication resources are conflicting. As described elsewhere herein, resources may be conflicting if, for example, a separation time between them is less than a predetermined duration (including where there is no separation time between the resources).

If the communication resources are not conflicting, then control passes to step S1406 and the communications device transmits or receives using the first communication resources. This transmission/reception may be in accordance with broadly conventional techniques.

Control then passes to step S1408 in which the communications device transmits or receives using the second communication resources. This transmission/reception may be in accordance with broadly conventional techniques. The process then ends.

If, at step S1404, it is determined that the communication resources are conflicting, then control passes to step S1410.

At step S1410, a duration of the switching time gap $T_{SWITCH}$ is determined. The duration may be a predetermined value, may be configured by the infrastructure equipment, and/or may be determined based on a bandwidth part within which the first or second communication resources are located and/or a subcarrier spacing associated with the first and/or second communication resources. The duration may be determined in accordance with any of the techniques disclosed herein. Control then passes to step S1412.

In step S1412, the location of the switching time gap $T_{SWITCH}$ is determined. The location may be determined based on one or more of a signalled or determined priority associated with the first and/or second communication resources, the duration of the first and/or second communication resources, which (if any) of the first and second communication resources are for uplink transmission, coding rates for use when encoding data to be transmitted (either by the communications device or the infrastructure equipment) via the first and/or second communication resources, a bandwidth part within which the first or second communication resources are located, and a relative order in which allocation messages, allocating the first and second communication resources, were received.

The location of the switching time gap $T_{SWITCH}$ may be determined in accordance with any of the example techniques disclosed herein.

The determined location may overlap in time with a part of one or both of the first and second communication resources.

Control then passes to step S1414. In step S1414, the communications device determines an arrangement and/or symbol order for the transmission of encoded data using one or both of the first and second communication resources which overlap the switching time gap $T_{SWITCH}$. This determination may comprise determining a code rate based on the amount of the communication resources which do not overlap the switching time gap $T_{SWITCH}$.

The determination may comprise determining additional communication resources which extend in time from the allocated communication resources and which are to be used together with communication resources which overlap the switching time gap $T_{SWITCH}$.

The determination may comprise determining whether the switching time gap $T_{SWITCH}$ overlaps one or more symbols which (in the absence of the switching time gap $T_{SWITCH}$) would be used to transmit reference signals and, if so, to determine a different order for transmission of the symbols compared to an order which would be used if the switching time gap $T_{SWITCH}$ did not overlap the communication resources.

Step S1414 may be carried out in accordance with any of the example techniques disclosed herein and may be performed in respect of uplink and/or downlink communication resources.

Control then passes to step S1416 in which the communications device determines an encoding scheme and/or rate for the data for transmission. The encoding may be based on the extent of the communication resources which do not overlap the switching time gap $T_{SWITCH}$, for example, by rate-matching the quantity of data to be encoded in accordance with the extent of the communication resources which do not overlap the switching time gap $T_{SWITCH}$.

Step S1416 may be carried out in accordance with any of the example techniques disclosed herein and may be performed in respect of uplink and/or downlink communication resources.

Control then passes to step S1418 and step S1420, during which the communications device transmits or receives encoded data via the first and second communication resources respectively, in accordance with the determinations made at step S1414 and step S1416 as applicable.

In step S1422, the communications device decodes data transmitted using the first and/or second communication resources. The decoding may be based on the arrangement or order for transmission determined at step S1414 in respect of the communication resources. The decoding may be in accordance with the encoding scheme and/or rate determined at step S1416.

After step S1422, the process ends.

In some embodiments, the order of steps may be modified. In some embodiments, one or more steps may be omitted, or modified. For example, in some embodiments, one or more steps may be carried out in accordance with conventional techniques. Steps S1416 and S1414 may be carried out in respect of both first and second communication resources, or in respect of only one of the first and second communication resources. Where one or both of steps S1416 and S1414 are not carried out in respect of either of the first or second communication resources, the transmission or reception at the corresponding steps S1418 and S1420 may be in accordance with conventional techniques.

It will be appreciated that a corresponding process may be carried out by the infrastructure equipment (or other entity responsible for allocating communication resources).

In some embodiments, the infrastructure equipment may determine a desired duration and/or location of the switching time gap, and may select the first and second communication resources based on the outcome of such determination. Additionally or alternatively, the infrastructure equipment may transmit one or more indications (e.g. by means of DCI or RRC configuration messages) so that the communications device, carrying out the process of FIG. 12 in accordance with embodiments of the present technique, determines the location and/or duration of the switching time gap determined by the infrastructure equipment.

Accordingly, the process of FIG. 12, when performed by an infrastructure equipment, may be accordingly modified such that the details of the steps may be modified and/or the order in which the steps are performed may be different, falls within the scope of the present disclosure.

In some embodiments, the behaviour of the communications device during the determined switching time gap may not be restricted, for example, by standards specifications—that is, it may be permitted for the communications device to refrain entirely from transmitting or receiving during the switching time gap or to attempt to transmit and/or receive during some part of the switching time gap.

The infrastructure equipment may accordingly refrain from relying on signals received within resources allocated for the transmission of data, which overlap with the determined switching time gap, by the communications device when attempting to decode the data. For example, the infrastructure equipment may discard signals received using a portion of the resources allocated for the transmission of data which overlap with the determined switching time gap, before attempting to decode the data transmitted using the allocated resources. Accordingly, embodiments of the present technique can minimise a possibility of incorrectly decoding data based on signals which were not transmitted by the communications device.

The infrastructure equipment may in some embodiments, transmit using all of communication resources allocated for the transmission of data to the communications device. Where the communications device refrains from receiving signals during only a sub-portion of the duration when the switching time gap overlaps resources allocated for downlink transmission, the communications device may thus receive some signals which were transmitted during the switching time gap and may be used to attempt to decode the data. Accordingly, embodiments of the present technique can increase a possibility of correctly decoding data by the communications device, based on signals which were not transmitted during the switching time gap by the infrastructure equipment.

In some embodiments, the infrastructure equipment may refrain from transmitting or receiving signals during the switching time gap. In particular, in some embodiments when an order or arrangement for the transmission of symbols is different from an order or arrangement for the transmission of symbols that would be used in the absence of the switching time gap, the infrastructure equipment may refrain from transmitting or receiving signals during the switching time gap and/or from relying upon such signals in attempting to decode data.

In some embodiments, priorities associated with the first and second conflicting communication resources are determined, and the determination of the switching time gap location is based on the determined priorities. It will be appreciated that in some embodiments, the determination of the priorities may be omitted and the determination of the switching time gap location may be determined directly (or otherwise) in accordance with techniques and principles disclosed herein, without the intermediate step of determining priorities associated with the resources. For example, in accordance with some embodiments, it may be that the switching time gap is determined to overlap whichever of the conflicting resources are for downlink transmissions. In some such embodiments, this determination may be made without an intermediate step of determining priorities associated with either, or each, of the conflicting resources.

In some embodiments, the wireless access interface may be divided in the time domain into symbol periods. For example, the wireless access interface may be based on orthogonal frequency division multiplexing, and an OFDM symbol period may be a time unit of the resources of the wireless access interface. In some embodiments, different technologies may be used, such as single-carrier frequency division multiple access (SC-FDMA). In some embodiments, different technologies may be used for the uplink and downlink of a bi-directional wireless access interface.

Accordingly, references herein to, for example, OFDM, are provided as an example.

Above have been given descriptions of example processes combining sequences of steps and messages in combination. The scope of the present disclosure is not, however, limited to such specific combinations and in some embodiments, various of the steps and messages described may be omitted, or combined in a different order, or modified. Features or steps described in the context of one example may be combined with features or steps described in the context of another example.

For example, a combination of techniques disclosed above may be used to determine the switching time gap location, in accordance with a predetermined order of precedence. For example, a configuration associated with a BWP may be used to determine the switching gap location, if such a configuration has been performed by the infrastructure equipment. If no such configuration exists, one or more other techniques may be used to determine the switching gap location. The present disclosure is not limited to this example combination.

Thus there has been described a method of operating a communications device, the method comprising determining that first communication resources are allocated for one of transmission and reception of signals by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a first priority associated with the first communication resources, determining a second priority associated with the second communication resources, determining a start of a switching time gap based on the first priority and the second priority, controlling a receiver of the communications device to refrain from receiving signals during the switching time gap, controlling a transmitter of the communications device to refrain from transmitting signals during the switching time gap, and transmitting or receiving first data using at least a portion of one of the first and second communication resources.

There has also been disclosed a method of operating a communications device, the method comprising determining that first communication resources are allocated for the transmission of the data by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a switching time gap during which the communications device may refrain from transmitting and receiving signals, determining that the switching time gap overlaps in time the first communication resources, in response to determining that the switching time gap overlaps in time the first communication resources, encoding the data based on the determined switching time gap, and transmitting the encoded data using a portion of the first communication resources.

There has also been disclosed a method of operating a communications device, the method comprising determining that first communication resources are allocated for the transmission of the data by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a switching time gap during which the communications device may refrain from transmitting and receiving signals, determining that the switching time gap overlaps in time the first communication resources, encoding the data to form symbols, determining an order for transmission of the symbols based on the switching time gap, and transmitting the symbols in accordance with the determined order, using at least a portion of the first communication resources.

There has further been disclosed a method of operating an infrastructure equipment of a wireless communications network, the method comprising determining that first communication resources are allocated for one of transmission and reception of signals by a communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a first priority associated with the first communication resources, determining a second priority associated with the second communication resources, determining a start of a switching time gap based on the first priority and the second priority, receiving signals using one of the first and second communication resources, the signals comprising signals transmitted by the communications device, and decoding the signals based on the switching time gap.

There has also been disclosed a method of operating an infrastructure equipment of a wireless communications network, the method comprising determining that first communication resources are allocated for one of transmission and reception of signals by a communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a first priority associated with the first communication resources, determining a second priority associated with the second communication resources, determining a start of a switching time gap based on the first priority and the second priority, receiving signals using one of the first and second communication resources, the signals comprising signals transmitted by the communications device, and decoding the signals based on the switching time gap.

Corresponding apparatus, circuitry and computer readable media have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches can be applied in respect of any type communications device operating with a wireless link to the communication network or to another communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device, the method comprising determining that first communication resources are allocated for one of transmission and reception of signals by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a first priority associated with the first communication resources, determining a second priority associated with the second communication resources, determining a start of a switching time gap based on the first priority and the second priority, controlling a receiver of the communications device to refrain from receiving signals during the switching time gap, controlling a transmitter of the communications device to refrain from transmitting signals during the switching time gap, and transmitting or receiving first data using at least a portion of one of the first and second communication resources.

Paragraph 2. A method according to paragraph 1, wherein controlling the receiver of the communications device to refrain from receiving signals during the switching time gap comprises controlling the receiver of the communications device to refrain from receiving signals during the entire switching time gap, and controlling the transmitter of the communications device to refrain from transmitting signals during the switching time gap comprises controlling the transmitter of the communications device to refrain from transmitting signals during the entire switching time gap.

Paragraph 3. A method according to paragraph 1 or paragraph 2, wherein the first priority is based on a layer 1 (L1) priority indication associated with the first communication resources.

Paragraph 4. A method according to any of paragraphs 1 to 3, wherein the second priority is based on a layer 1 (L1) priority indication associated with the second communication resources.

Paragraph 5. A method according to any of paragraphs 1 to 4, wherein the second communication resources are allocated for the transmission of downlink data to the communications device, third communication resources are allocated for the transmission of acknowledgement information associated with the downlink data and are associated with a layer 1 (L1) priority indication, and the second priority is based on the L1 priority indication associated with the third communication resources.

Paragraph 6. A method according to paragraph 1 or paragraph 2, wherein determining that first communication resources are allocated for one of transmission and reception of signals by the communications device comprises receiving at a first time an indication of the allocation of the first communication resources, determining that second communication resources are allocated for one of transmission and reception of signals by the communications device comprises receiving at a second time an indication of the allocation of the second communication resources, and the first priority and the second priority are determined based on the first time and the second time.

Paragraph 7. A method according to paragraph 6, wherein when the first time is before the second time, the first priority is determined to be lower than the second priority.

Paragraph 8. A method according to any of paragraphs 1 to 7, wherein determining the first priority comprises receiving an indication of the first priority, and determining the second priority comprises receiving an indication of the second priority.

Paragraph 9. A method according to paragraph 1 or paragraph 2, the method comprising transmitting the first data a plurality of times, one of the plurality of times using the first communication resources, wherein determining the first priority associated with the first communication resources and determining the second priority associated with the second communication resources comprises determining the first priority which is lower than the second priority.

Paragraph 10. A method according to any of paragraphs 1 to 9, the method comprising determining that the first communication resources are allocated for the transmission of the data by the communications device, determining that the first communication resources occur later in time than the second communication resources, and determining that reference signals are to be transmitted using a first symbol of the first communication resources, wherein determining the first priority associated with the first communication resources and determining the second priority associated with the second communication resources comprises determining a priority for the first communication resources which is higher than a priority determined for the second communication resources.

Paragraph 11. A method according to any of paragraphs 1 to 10, the method comprising determining that a duration of the first communication resources is greater than a duration of the second communication resources, and in response to determining that the duration of the first communication resources is greater than the duration of the second communication resources, determining the first priority and the second priority such that the second priority is higher than the first priority.

Paragraph 12. A method according to any of paragraphs 1 to 11, wherein the first priority and the second priority are determined based on a first coding rate for transmission of data using the first communication resources and a second coding rate for transmission of data using the second communication resources.

Paragraph 13. A method according to paragraph 12, wherein if the first coding rate is lower than the second coding rate, the first priority and the second priority are determined such that the second priority is higher than the first priority.

Paragraph 14. A method according to any of paragraphs 1 to 13, wherein the first communication resources are within a first bandwidth part (BWP) of the wireless access interface, the second communication resources are within a second bandwidth part of the wireless access interface, and the first and second priorities are determined based on one or both of the first and second bandwidth parts.

Paragraph 15. A method according to paragraph 14, wherein one of the first and second bandwidth parts is associated with a rule for determining the first and second priorities, and the first and second priorities are determined in accordance with the rule.

Paragraph 16. A method according to paragraph 14 or paragraph 15, the method comprising determining a duration of the switching time gap based on one or both of the first and second bandwidth parts.

Paragraph 17. A method according to any of paragraphs 14 to 16, wherein the duration of the switching time gap is determined based on an interruption duration for BWP switching associated with one of the first and second bandwidth parts.

Paragraph 18. A method according to any of paragraphs 1 to 17, wherein the start of the switching time gap is determined based on a timing advance applicable to transmissions by the communications device.

Paragraph 19. A method according to any of paragraphs 1 to 18, wherein when the first priority is higher than the second priority, the start of the switching time gap is determined such that the switching time gap does not overlap the first communication resources.

Paragraph 20. A method according to any of paragraphs 1 to 19, the method comprising determining that the first priority and the second priority are equal, and in response to determining that the first priority and the second priority are equal, determining the start of the switching time gap such that the switching time gap overlaps a first portion of the first communication resources and a second portion of the second communication resources.

Paragraph 21. A method according to any of paragraphs 1 to 20, the method comprising transmitting a switching time gap indication indicating the location in time of the switching time gap.

Paragraph 22. A method according to any of paragraphs 1 to 21, wherein the communications device is a half-duplex frequency division duplexing (HD-FDD) communications device which is configured to refrain from transmitting signals on the wireless access interface at a first frequency when receiving signals on the wireless access interface at a second frequency different from the first frequency.

Paragraph 23. A method according to any of paragraphs 1 to 22, wherein the communications device is not capable of transmitting or receiving using all of the first communication resources and all of the second communication resources in accordance with the allocation of the first communication resources and the allocation of the second communication resources.

Paragraph 24. A method according to any of paragraphs 1 to 23, wherein the first communication resources are allocated for the transmission of the first data by the communications device, the method comprising determining that the switching time gap overlaps in time the first communication resources in response to determining that the switching time gap overlaps in time the first communication resources, encoding the first data based on the determined switching time gap, and transmitting the first data using a portion of the first communication resources.

Paragraph 25. A method according to any of paragraphs 1 to 24, wherein the first communication resources are allocated for the transmission of the first data by the communications device, determining that the switching time gap overlaps in time the first communication resources, encoding the first data to form symbols, determining an order for transmission of the symbols based on the switching time gap, and transmitting the symbols in accordance with the determined order, using at least a portion of the first communication resources.

Paragraph 26. A method according to paragraph 25, the method comprising: determining third communication resources, the third communication resources being adjacent in time to the first communication resources, wherein transmitting the symbols comprises all of the symbols using a portion of the first communication resources which does not overlap the switching time gap and the third communication resources.

Paragraph 27. A method according to any of paragraphs 1 to 26, wherein the first communication resources and the second communication resources are communication resources of a wireless access interface provided by an infrastructure equipment of a wireless communications network.

Paragraph 28. A method according to paragraph 27, wherein determining that the first communication resources are allocated for one of transmission and reception of signals by the communications device comprises receiving a first allocation indication transmitted by the infrastructure equipment, and determining that the second communication resources are allocated for one of transmission and reception of signals by the communications device comprises receiving a second allocation indication transmitted by the infrastructure equipment.

Paragraph 29. A method of operating a communications device, the method comprising determining that first communication resources are allocated for the transmission of the data by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a switching time gap during which the communications device may refrain from transmitting and receiving signals, determining that the switching time gap overlaps in time the first communication resources, in response to determining that the switching time gap overlaps in time the first communication resources, encoding the data based on the determined switching time gap, and transmitting the encoded data using a portion of the first communication resources.

Paragraph 30. A method according to paragraph 29, wherein the determining that the time period separating the first and second communication resources is below the predetermined maximum switching time threshold occurs at a first time, the first communication resources begin at a second time, the method comprising determining that the first time precedes the second time by more than a predetermined uplink rate-matching decision threshold time, and wherein encoding the data based on the determined switching time gap is in response to determining that the first time precedes the second time by more than the predetermined uplink rate-matching decision threshold time.

Paragraph 31. A method of operating a communications device, the method comprising determining that first communication resources are allocated for the transmission of the data by the communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a switching time gap during which the communications device may refrain from transmitting and receiving signals, determining that the switching time gap overlaps in time the first communication resources, encoding the data to form symbols, determining an order for transmission of the symbols based on the switching time gap, and transmitting the symbols in accordance with the determined order, using at least a portion of the first communication resources.

Paragraph 32. A method according to paragraph 31, the method comprising transmitting reference signals within a symbol period of the first communication resources, wherein the symbol period is an earliest symbol period of the first communications resources which does not overlap in time with the switching time gap.

Paragraph 33. A method according to paragraph 31 or paragraph 32, wherein, in accordance with the determined order, no symbol is transmitted during a symbol period of the first communication resources which overlaps with the switching time gap.

Paragraph 34. A method according to any of paragraphs 31 to 33, wherein, in accordance with the determined order, each symbol which is transmitted in a symbol period of the first communication resources and does not comprise reference signals is an symbol that would be transmitted in the symbol period if the time period separating the first and second communication resources is not below the predetermined maximum switching time threshold.

Paragraph 35. A method according to any of paragraphs 31 to 34, wherein, in accordance with the determined order, symbols are transmitted in a same order as an order of symbols that would be transmitted if the time period separating the first and second communication resources is not below the predetermined maximum switching time threshold.

Paragraph 36. A method according to paragraph 31, the method comprising determining third communication resources, the third communication resources being adjacent in time to the first communication resources, wherein transmitting the symbols comprises all of the symbols using a portion of the first communication resources which does not overlap the switching time gap and the third communication resources.

Paragraph 37. A method of operating an infrastructure equipment of a wireless communications network, the method comprising determining that first communication resources are allocated for one of transmission and reception of signals by a communications device, determining that second communication resources are allocated for one of transmission and reception of signals by the communications device, the second communication resources being at a different frequency from the first communication resources, determining that a time period separating the first and second communication resources is below a predetermined maximum switching time threshold, determining a first priority associated with the first communication resources, determining a second priority associated with the second communication resources, determining a start of a switching time gap based on the first priority and the second priority, receiving signals using one of the first and second communication resources, the signals comprising signals transmitted by the communications device, and decoding the signals based on the switching time gap.

Paragraph 38. A method according to paragraph 37, the method comprising encoding data to generate signals for transmission to the communications device based on the switching time gap, and transmitting the signals to the communications device.

Paragraph 39. A communications device for operating in a wireless communications network, the communications device comprising a transmitter configured to transmit signals via a wireless access interface, a receiver configured to receive signals via the wireless access interface, and a controller configured to control the transmitter and the receiver so that the communications device is operable: to determine that first communication resources of the wireless access interface are allocated for one of transmission and reception of signals by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a first priority associated with the first communication resources, to determine a second priority associated with the second communication resources, to determine a start of a switching time gap based on the first priority and the second priority, to refrain from receiving signals during the switching time gap, to refrain from transmitting signals during the switching time gap, and to transmit or to receive first data using at least a portion of one of the first and second communication resources.

Paragraph 40. Circuitry for a communications device for operating in a wireless communications network, the circuitry comprising transmitter circuitry configured to transmit signals via a wireless access interface, receiver circuitry configured to receive signals via the wireless access interface, and controller circuitry configured to control the transmitter circuitry and the receiver circuitry so that the communications device is operable: to determine that first communication resources of the wireless access interface are allocated for one of transmission and reception of signals by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a first priority associated with the first communication resources, to determine a second priority associated with the second communication resources, to determine a start of a switching time gap based on the first priority and the second priority, to refrain from receiving signals during the switching time gap, to refrain from transmitting signals during the switching time gap, and to transmit or to receive first data using at least a portion of one of the first and second communication resources.

Paragraph 41. A communications device for operating in a wireless communications network, the communications device comprising a transmitter configured to transmit signals via a wireless access interface, a receiver configured to receive signals via the wireless access interface, and a controller configured to control the transmitter and the receiver so that the communications device is operable: to determine that first communication resources of the wireless access interface are allocated for the transmission of the data by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a switching time gap during which the communications device may refrain from transmitting and receiving signals, to determine that the switching time gap overlaps in time the first communication resources, in response to determining that the switching time gap overlaps in time the first communication resources, to encode the data based on the determined switching time gap, and to transmit the encoded data using a portion of the first communication resources.

Paragraph 42. Circuitry for a communications device for operating in a wireless communications network, the circuitry comprising transmitter circuitry configured to transmit signals via a wireless access interface, receiver circuitry configured to receive signals via the wireless access interface, and controller circuitry configured to control the transmitter circuitry and the receiver circuitry so that the communications device is operable: to determine that first communication resources of the wireless access interface are allocated for the transmission of the data by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a switching time gap during which the communications device may refrain from transmitting and receiving signals, to determine that the switching time gap overlaps in time the first communication resources, in response to determining that the switching time gap overlaps in time the first communication resources, to encode the data based on the determined switching time gap, and to transmit the encoded data using a portion of the first communication resources.

Paragraph 43. A communications device for operating in a wireless communications network, the communications device comprising a transmitter configured to transmit signals via a wireless access interface, a receiver configured to receive signals via the wireless access interface, and a controller configured to control the transmitter and the receiver so that the communications device is operable: to determine that first communication resources of the wireless access interface are allocated for the transmission of the data by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a switching time gap during which the communications device may refrain from transmitting and receiving signals, to determine that the switching time gap overlaps in time the first communication resources, to encode the data to form symbols, to determine an order for transmission of the symbols based on the switching time gap, and to transmit the symbols in accordance with the determined order, using at least a portion of the first communication resources.

Paragraph 44. Circuitry for a communications device for operating in a wireless communications network, the circuitry comprising transmitter circuitry configured to transmit signals via a wireless access interface, receiver circuitry configured to receive signals via the wireless access interface, and controller circuitry configured to control the transmitter circuitry and the receiver circuitry so that the communications device is operable: to determine that first communication resources of the wireless access interface are allocated for the transmission of the data by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a switching time gap during which the communications device may refrain from transmitting and receiving signals, to determine that the switching time gap overlaps in time the first communication resources, to encode the data to form symbols, to determine an order for transmission of the symbols based on the switching time gap, and to transmit the symbols in accordance with the determined order, using at least a portion of the first communication resources.

Paragraph 45. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to determine that first communication resources of the wireless access interface are allocated for one of transmission and reception of signals by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a first priority associated with the first communication resources, to determine a second priority associated with the second communication resources, to determine a start of a switching time gap based on the first priority and the second priority, to receive signals using one of the first and second communication resources, the signals comprising signals transmitted by the communications device, and to decode the signals based on the switching time gap.

Paragraph 46. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to determine that first communication resources of the wireless access interface are allocated for one of transmission and reception of signals by the communications device, to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold, to determine a first priority associated with the first communication resources, to determine a second priority associated with the second communication resources, to determine a start of a switching time gap based on the first priority and the second priority, to receive signals using one of the first and second communication resources, the signals comprising signals transmitted by the communications device, and to decode the signals based on the switching time gap.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] RP-193238, "New SID on Support of Reduced Capability NR Devices," Ericsson, RAN #86
[4] 3GPP TS 36.300 "Evolved Universal Terrestrial Radio Access (E-UTRA) and Evolved Universal Terrestrial Radio Access Network (E-UTRAN); Overall description; Stage 2", version 16.1.0, April 2020

What is claimed is:

1. A method of operating a communications device, the method comprising:
determining that first communication resources are allocated for one of transmission and reception of signals by the communications device,
determining that second communication resources are allocated for one of transmission and reception of signals by the communications device, the second communication resources being at a different frequency from the first communication resources,
determining that a time period separating the first and second communication resources is below a predetermined maximum switching time threshold,
determining a first priority associated with the first communication resources,
determining a second priority associated with the second communication resources,
determining a start of a switching time gap, which is a portion of the time period separating the first and second communication resources, based on the first priority and the second priority,
determining at least one characteristic of the first communication resources and at least one characteristic of the second communication resources to derive a prioritization of the resources,
dynamically adjusting a location of the switching time gap based on the derived prioritization,
controlling a receiver of the communications device to refrain from receiving signals during the switching time gap,
controlling a transmitter of the communications device to refrain from transmitting signals during the switching time gap, and
transmitting or receiving first data using at least a portion of one of the first and second communication resources.

2. The method according to claim 1, wherein
controlling the receiver of the communications device to refrain from receiving signals during the switching time gap comprises controlling the receiver of the communications device to refrain from receiving signals during the entire switching time gap, and
controlling the transmitter of the communications device to refrain from transmitting signals during the switching time gap comprises controlling the transmitter of the communications device to refrain from transmitting signals during the entire switching time gap.

3. The method according to claim 1, wherein
the first priority is based on a layer 1 (L1) priority indication associated with the first communication resources.

4. The method according to claim 1, wherein
the second priority is based on a layer 1 (L1) priority indication associated with the second communication resources.

5. The method according to claim 1, wherein
the second communication resources are allocated for the transmission of downlink data to the communications device,
third communication resources are allocated for the transmission of acknowledgement information associated with the downlink data and are associated with a layer 1 (L1) priority indication, and
the second priority is based on the L1 priority indication associated with the third communication resources.

6. The method according to claim 1, wherein
determining that first communication resources are allocated for one of transmission and reception of signals by the communications device comprises receiving at a first time an indication of the allocation of the first communication resources,
determining that second communication resources are allocated for one of transmission and reception of signals by the communications device comprises receiving at a second time an indication of the allocation of the second communication resources, and
the first priority and the second priority are determined based on the first time and the second time.

7. The method according to claim 6, wherein when the first time is before the second time, the first priority is determined to be lower than the second priority.

8. The method according to claim 1, wherein determining the first priority comprises receiving an indication of the first priority, and
determining the second priority comprises receiving an indication of the second priority.

9. The method according to claim 1, the method comprising
transmitting the first data a plurality of times, one of the plurality of times using the first communication resources, wherein
determining the first priority associated with the first communication resources and determining the second priority associated with the second communication resources comprises determining the first priority which is lower than the second priority.

10. The method according to claim 1, the method comprising
determining that the first communication resources are allocated for the transmission of the data by the communications device,
determining that the first communication resources occur later in time than the second communication resources, and
determining that reference signals are to be transmitted using a first symbol of the first communication resources, wherein
determining the first priority associated with the first communication resources and determining the second priority associated with the second communication resources comprises determining a priority for the first communication resources which is higher than a priority determined for the second communication resources.

11. The method according to claim 1, the method comprising
determining that a duration of the first communication resources is greater than a duration of the second communication resources, and
in response to determining that the duration of the first communication resources is greater than the duration of the second communication resources, determining the first priority and the second priority such that the second priority is higher than the first priority.

12. The method according to claim 1, wherein the first priority and the second priority are determined based on a first coding rate for transmission of data using the first communication resources and a second coding rate for transmission of data using the second communication resources.

13. The method according to claim 12, wherein if the first coding rate is lower than the second coding rate, the first priority and the second priority are determined such that the second priority is higher than the first priority.

14. The method according to claim 1, wherein
the first communication resources are within a first bandwidth part (BWP) of the wireless access interface,
the second communication resources are within a second bandwidth part of the wireless access interface, and
the first and second priorities are determined based on one or both of the first and second bandwidth parts.

15. The method according to claim 1, wherein the start of the switching time gap is determined based on a timing advance applicable to transmissions by the communications device.

16. The method according to claim 1, wherein when the first priority is higher than the second priority, the start of the switching time gap is determined such that the switching time gap does not overlap the first communication resources.

17. The method according to claim 1, the method comprising
determining that the first priority and the second priority are equal, and
in response to determining that the first priority and the second priority are equal, determining the start of the switching time gap such that the switching time gap overlaps a first portion of the first communication resources and a second portion of the second communication resources.

18. The method according to claim 1, the method comprising
transmitting a switching time gap indication indicating the location in time of the switching time gap.

19. A communications device for operating in a wireless communications network, the communications device comprising:
a transmitter configured to transmit signals via a wireless access interface,
a receiver configured to receive signals via the wireless access interface, and
a controller configured to control the transmitter and the receiver so that the communications device is operable:
to determine that first communication resources of the wireless access interface are allocated for the transmission of the data by the communications device,
to determine that second communication resources of the wireless access interface are allocated for one of transmission and reception of signals by the communications device, the second communication resources being at a different frequency from the first communication resources,
to determine that a time period separating the first and second communication resources is below a predetermined maximum switching time threshold,
to determine a switching time gap, which is a portion of the time period separating the first and second communication resources, during which the communications device may refrain from transmitting and receiving signals,
to determine that the switching time gap overlaps in time the first communication resources,
to encode the data to form symbols,
to determine an order for transmission of the symbols based on the switching time gap, and
to transmit the symbols in accordance with the determined order, using at least a portion of the first communication resources.

20. Infrastructure equipment for use in a wireless communications network, the infrastructure equipment providing a wireless access interface for communicating with a communications device in a cell, the infrastructure equipment comprising:
a transmitter configured to transmit signals to the communications device via the wireless access interface,
a receiver configured to receive signals from the communications device, and
a controller configured to control the transmitter and the receiver so that the infrastructure equipment is operable:
to determine that first communication resources of the wireless access interface are allocated for one of transmission and reception of signals by the communications device,
to determine that second communication resources of the wireless access interface are allocated for one of transmission and reception of signals by the communications device, the second communication resources being at a different frequency from the first communication resources, to determine that a time period separating the first and second communication resources is below a predetermined maximum switching time threshold,
to determine a first priority associated with the first communication resources,
to determine a second priority associated with the second communication resources,
to determine a start of a switching time gap, which is a portion of the time period separating the first and second communication resources, based on the first priority and the second priority,
to determine at least one characteristic of the first communication resources and at least one characteristic of the second communication resources to derive a prioritization of the resources,
to dynamically adjust a location of the switching time gap based on the derived prioritization,
to receive signals using one of the first and second communication resources, the signals comprising signals transmitted by the communications device, and
to decode the signals based on the switching time gap.

* * * * *